United States Patent [19]
Kato et al.

[11] Patent Number: 5,857,659
[45] Date of Patent: Jan. 12, 1999

[54] MOUNTING COMPONENT FOR A CYLINDRICAL BUSHING AND A MOUNTING BODY

[75] Inventors: Rentaro Kato, Kasugai; Sadao Kokubo, Akenomachi; Masaharu Tochigi, Tochigishi, all of Japan

[73] Assignees: Tokai Rubber Industries, Ltd.; Showa Aluminum Corporation, both of Japan

[21] Appl. No.: 759,168

[22] Filed: Dec. 3, 1996

[30] Foreign Application Priority Data

Dec. 4, 1995 [JP] Japan ................................... 7-315485
Mar. 22, 1996 [JP] Japan ................................... 8-065813

[51] Int. Cl.⁶ .................................................. F16M 13/00
[52] U.S. Cl. .......................... 248/634; 248/638; 248/74; 24/20 CW; 24/20 W; 403/364
[58] Field of Search ................................... 248/634, 609, 248/608, 638, 74.1, 74.2, 56, 65; 24/20 CW, 20 TT, 20 W, 20 EE; 403/364, 354, 282; 474/253, 254, 255

[56] References Cited

U.S. PATENT DOCUMENTS

| | | |
|---|---|---|
| 862,749 | 8/1907 | McLaughlin . |
| 4,557,024 | 12/1985 | Roberts et al. ........................ 24/20 TT |
| 4,817,897 | 4/1989 | Krausel ................................... 248/74.1 |
| 4,821,379 | 4/1989 | Spaulding .............................. 24/20 TT |
| 5,009,376 | 4/1991 | Usui ....................................... 248/74.1 |
| 5,248,119 | 9/1993 | Imura ........................................ 248/65 |
| 5,339,496 | 8/1994 | Oeitiker ..................................... 24/20 |
| 5,482,234 | 1/1996 | Lyon ..................................... 248/74.5 |
| 5,497,973 | 3/1996 | Balzen et al. ........................... 248/551 |
| 5,544,849 | 8/1996 | Peterson et al. ...................... 248/74.1 |

FOREIGN PATENT DOCUMENTS 288687  11/1989  Japan ....................... 248/65

*Primary Examiner*—Leslie A. Braun
*Assistant Examiner*—Kimberly Wood

[57] ABSTRACT

The mounting component for a cylindrical bushing is comprised of a holder into which a cylindrical bushing can be fitted. An opening is formed at one location in a circumference direction of the holder such that the opening extends in an axial direction. At the opening, the holder can be opened in an expanding manner. When the opening is closed, the inner circumference surface of the holder is tightly attached to the outer circumference surface of the bushings to effect a clamping fastening method wherein the bushing is fitted and fixed inside the holder. Joints are provided on the two opening edges, or in their vicinity, of the aforementioned opening, in such a way that the joints protrude toward the outer circumference surface, These joints are bonded by a coupling structure using plastic deformation, and thus maintain the opening in a closed state.

5 Claims, 22 Drawing Sheets

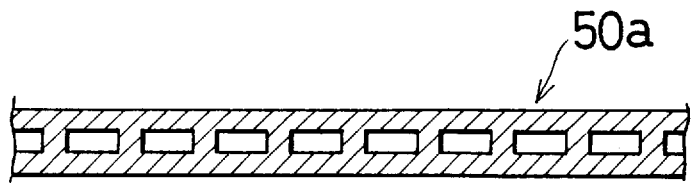
FIG. 24A
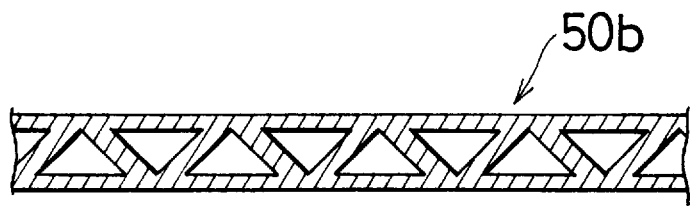
FIG. 24B
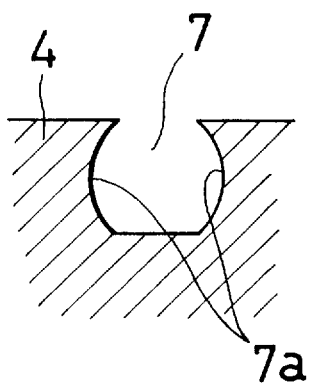 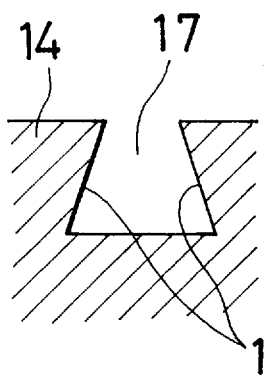 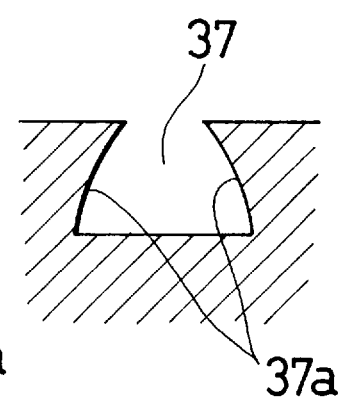
FIG. 25A    FIG. 25B    FIG. 25C
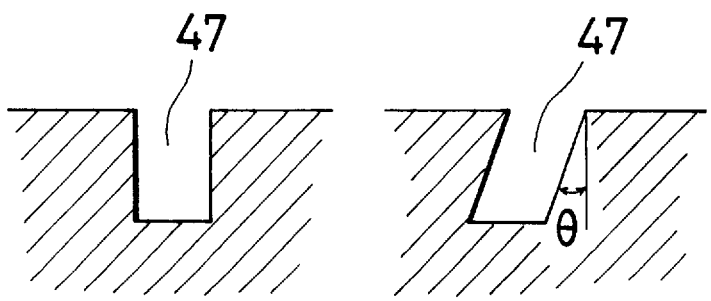
FIG. 26A    FIG. 26B

MOUNTING COMPONENT FOR A CYLINDRICAL BUSHING AND A MOUNTING BODY

FIELD OF TECHNOLOGY

This invention relates to a mounting component for a cylindrical bushing and to a mounting body having a cylindrical bushing attached as a mounting component used as anti-vibration mounts that support vibrating units such as automobile engines, or as automobile suspension arms such as upper arms, lower arms, and torsion bars.

For the purposes of the present Specification, the term "aluminum" refers to either aluminum or its alloy.

RELATED ART

Generally the aforementioned anti-vibration mounts and automobile suspension arms are composed of mounting bodies for bushing in which a cylindrical bushing is attached as a mounting component. Previously press-fitted component for mounting bushings have been used almost exclusively. Such a press-fitted mounting body comprises an aluminum or other metallic mounting component or a synthetic resin mounting component that is comprised of a round holder, into which a cylindrical bushing is inserted. For a cylindrical bushing, an object is commonly used in which a center-positioned supporting axis is provided and a rigid sleeve, is provided around the supporting axis such that the outer radius of the sleeve is slightly larger than the inner radius of the holder and they are connected by a rubber elastic body that is inserted between them. In such a configuration, the aforementioned rigid sleeve for the bushing is fitted and fixed to the mounting component by press-fitting the sleeve into the holder for the mounting component.

With such a press-fitted mounting body for a bushing as described above, an easy press-fitting operation and the tightness of the bushing and the mounting component that is achieved after press-fitting are mutually conflicting goals. This requires stringent size precision between the bushing and the mounting component and necessitates special processing in order to provide the required level of size precision on the inner circumference of the holder for the mounting component.

In order to eliminate these drawbacks of the conventional mounting body for bushings, the present applicant has previously proposed a clamping-type mounting component for a bushing (Patent Application H7-165839 (1995)).

As shown in FIG. 27, the clamping-type component for mounting a bushing (101) is comprised of a holder (102) into which a cylindrical bushing is fitted. An opening (103) is created that extends in an axial direction at one location in the circumferential direction of the holder (102). At the opening (103) the holder (102) can be opened in a spanning manner. By enlarging the opening (103) within the range of the holder's elastic limit and essentially increasing the inner circumference length of the holder, the bushing (not shown in the figure) is fitted into the holder (102) and a force is imposed in the direction in which the opening (103) closes in order to tightly attach the inner circumference surface of the holder to the outer circumference surface of the bushing, thus fitting and fixing the bushing in the holder (102).

The clamping-type component for mounting a bushing (101) permits easy insertion of the bushing into the holder (102) because the opening (103) enlarges. Subsequently, the mounting component (101) can be clamped around the outer circumference surface of the bushing in order to securely fit and fix the mounting component. In this manner, when compared with the conventional press-fitting method, the new clamping-type component for mounting a bushing can ease the size precision requirements of the space between the bushing and the holder (102), and thus offers the advantage of eliminating the need for special machining for finishing the inner circumference surface of the holder for the mounting component to a high degree of size precision.

In the cylindrical component for mounting a bushing (101) of the above proposal, a protruding catch (104) is provided on one opening edge and a hook (105) is provided on the other opening edge opposite it as an opening coupling structure to hold the mounting component on the outer circumference surface of the bushing in a clamped condition so that, in the clamped condition, the catch (104) and the hook (105) are fastened to each other.

However, fastening the catch (104) and the hook (105) to each other securely and in a non-detachable manner requires highly stringent size precision for the shapes and the geometry between the catch (104) and the hook (105), and thus presents a new problem of requiring somewhat cumbersome machining for the fabrication of these components.

The present invention has been developed in view of this technological background. The purpose of the present invention is to provide a mounting component for a cylindrical bushing that is capable of easing the size precision requirements on the space between the bushing and the holder of the mounting component.

Another purpose of the present invention is to provide a mounting component for a cylindrical bushing that is capable of easing the size precision requirements of the opening coupling structure for holding the bushing in a clamped condition.

Still another purpose of the present invention is to provide a component for mounting a bushing to which a bushing is attached to function as the aforementioned mounting component.

To accomplish the above objectives, the mounting component for a cylindrical bushing of the present invention basically incorporates the aforementioned clamping method and uses the plastic deformation property of the component as an opening/coupling structure for holding the bushing in a clamped condition.

Specifically, the present invention concerns a clamping-type component for mounting a cylindrical bushing that is comprised of a holder into which a cylindrical bushing is fitted, such that an opening is formed that extends in an axial direction at one location in the circumferential direction in the aforementioned holder; at the opening the holder can be opened in a spanning manner; and the bushing can be fitted and fixed in the holder when the opening is held in a closed state and the inner circumference surface of the holder is tightly attached to the outer circumference surface of the bushing.

The present invention is characterized in that a pair of joints protruding from the outer circumference surface of the holder is provided either at the edges of the opening or in their vicinity; such that the opening is held in a closed state when these joints are coupled by means of a coupling structure that uses a plastic deformation.

Because the joints are coupled by using an appropriate plastic deformation, even when there are shape or size errors in the joints, it suffices to effect a plastic deformation so that those errors can be absorbed. Consequently this invention eliminates the necessity for stringent precision requirements.

The following may be cited as a specific coupling structure: one of the joints is provided with a flattened piece that protrudes toward the other joint, a railcut recess having an expanding section, the opening area of which increases in the depth direction, is formed at the position on the other joint that corresponds to the flattened piece, and the joints are coupled when said flattened piece is inserted into the railcut recess and when the flattened piece is plastically deformed in such a way that it bites into the expanding section so that it cannot be withdrawn. In such a coupling structure the joints are directly connected to each other and a great bonding strength can be produced through the performance of an efficient bonding task.

The following may also be cited as another example of a bonding structure: either a flattened piece is constructed or a railcut recess is created in each joint; a coupling device is placed between the joints, such that, on the coupling device, either a railcut recess is created in correspondence to said flattened piece on the joint or a flattened piece is created in correspondence to said railcut recess on the joint; such that the railcut recess possesses an expanding section the opening area of which increases in the depth direction; and such that the joints are connected by means of the coupling device either when the flattened piece of the one joint is inserted into the railcut recess of the coupling device and is plastically deformed in such a way that the flattened piece bites into the expanding section so that it cannot be withdrawn or when the flattened piece of the coupling device is inserted into the railcut recess of the joint and is plastically deformed in such a way that the flattened piece bites into the expanding section so that it cannot be withdrawn. In this case, even if a size error occurs in the railcut recess or in the flattened piece that is provided in the joints, by adjusting the position of the railcut recess or the flattened piece that is provided in the coupling device, the error can be absorbed, In this manner the need for great exactitude in mounting component for bushing size precision can further be eliminated.

As still another example of a coupling structure, the case can be cited wherein the joints are joined in a superimposed condition when a part of the joints is deformed in a shearing direction. This eliminates the need for providing biting grooves or flattened pieces on a joint and can thus simplify the structure of and reduce the thickness of the cross sections of the joints.

Lightweight mounting component for bushings can be fabricated easily if the mounting component for bushing is formed by cutting an extruded shaped material of aluminum or its alloy to a prescribed thickness in an extruded direction.

Furthermore, mounting component for bushings substantially longer than the diameter of the extrusion die can be produced if the extruded shaped material, in its cross-section, has at least one arc-shaped or V-shaped curved corner such that the mounting component for bushing is made by cutting the extruded shaped material to a prescribed thickness in an extruded direction and then machining and expanding the corner in a straight line. This makes it possible to fabricate long mounting components without welding.

The following explanation is intended to further the reader's understanding of other objectives, features, and advantages of the present invention.

BRIEF DESCRIPTION OF DRAWINGS

FIG. 5 shows the second embodiment mode of the present invention.

FIG. 24 shows an eighth embodiment mode of the present invention; it is a lateral cross-sectional view of a component that contains a hollow area.

In FIG. 24A, the hollow area has a harmonica shape.

In FIG. 24B, it has a truss shape.

FIG. 25 shows vertical cross-sectional views of various railcut recesses.

In FIG. 25A, the railcut recess is curved and possesses an enlarged section at the mid-point in the depth direction.

FIG. 25B shows a dovetail groove in which the enlarged part occupies the entire lateral side.

FIG. 25C shows a railcut recess that has a curved side in which the enlarged part occupies the entire lateral side.

FIGS. 26A and 26B are vertical cross-sectional views of railcut recesses.

Figure 1:
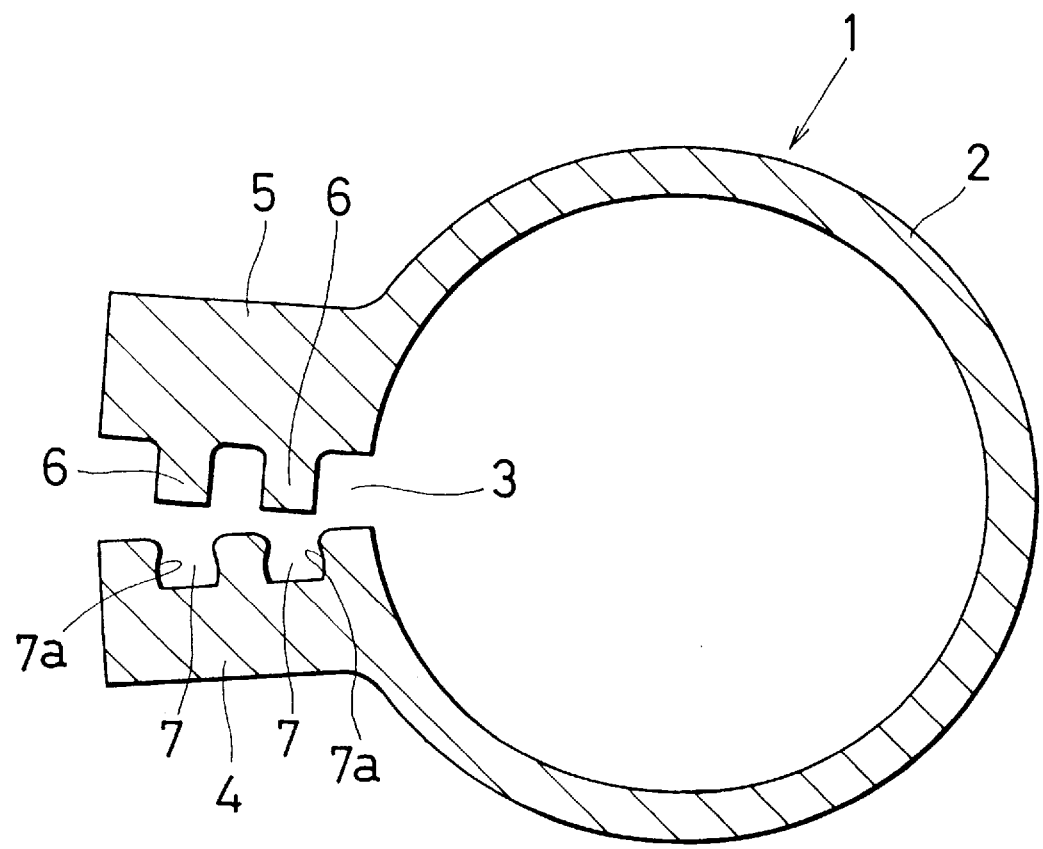
FIG. 1 shows the first embodiment mode of the present invention; it is a lateral cross-sectional view of the mounting component for bushing.

DETAILED DESCRIPTION OF THE INVENTION (Embodiment Mode 1)

FIGS. 1–4 show the first embodiment mode of the present invention as applied to an automobile engine-mounting bracket.

In FIGS. 1–4, (1) denotes a mounting component for bushing as a bracket; it is made by cutting an aluminum extruded shaped material into a specified length in the extruded direction. The mounting component (1) is comprised of a cylindrical holder (2) into which a cylindrical anti-vibration bushing is fitted. On the mounting component, one location in the circumferential direction of holder (2) is sectioned so that an opening (3) is formed that extends in an axial direction. Therefore, the holder (2) opens in a spanning manner at this opening (3).

On both open edges of the opening (3), a pair of joints (4) (5) with a square cross section, protruding on the outer circumference surface over the entire axial direction area, are provided at opposite positions in the circumference direction. On one of the opposite sides of the joints (4) (5), a flattened piece (6) with a square cross section that extends in an axial direction in two inner and outer columns is provided. Opposite the aforementioned flattened piece (6), a biting groove (7) that extends in an axial direction in two inner and outer columns is formed. The flattened piece (6) and the biting groove (7) serve to couple the joints (4) (5), and thus holds the opening (3) in a closed condition. This is done by packing the aforementioned flattened piece (6) into the biting groove (7) by plastically deforming the former. For this purpose, the biting groove (7) contains an enlarged section (7a) (at the mid-point in the depth direction) such that the groove is wider at the mid-point than at the upper or lower ends. Likewise, the flattened piece (6) is set so that the height of its protrusion is greater than the depth of the dovetail groove (7) and the lateral cross-sectional area of the flattened piece is set approximately equal to that of the dovetail groove (7). When the opening (3) is closed, the deformed and inserted flattened piece (6) bites deeply enough into the enlarged section (7a) to completely prevent the joints (4) (5) from separating.

Figure 2:
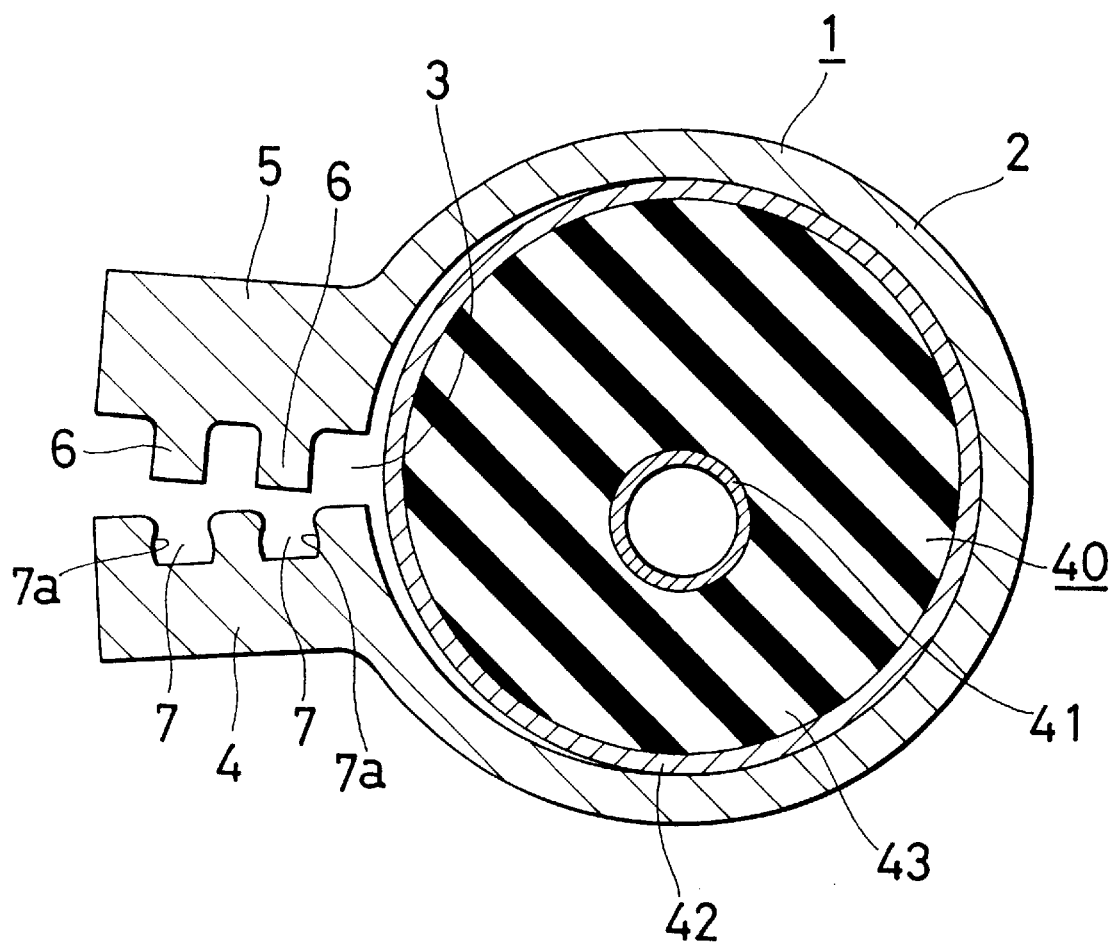
FIG. 2 is a lateral cross-sectional view of the mounting component for bushing of FIG. 1 on which a bushing is mounted.

The following explains how the mounting component for a bushing shown in FIGS. 1–4 is used: At the opening (3) the holder (2) is expanded within the range of the holder s elastic limit so that the inner circumference length of the holder is substantially increased. In this condition, a cylindrical anti-vibration bushing (40) is inserted into the holder (2), as shown in FIG. 2. In this embodiment mode a solid-type bushing (40) is used. In this bushing the center-positioned axial support component (41) and the cylindrical rigid sleeve (42) that is provided around the axial support component (41) are connected by a rubber elastic body (43), which is inserted between them. The outer diameter of the rigid sleeve (42) is set so that it is slightly larger than the inner diameter of the holder when the opening (3) of the holder (2) is closed. And, because the holder (2) is expanded at the opening (3), the bushing (40) can easily be inserted into the holder (2).

Figure 4:
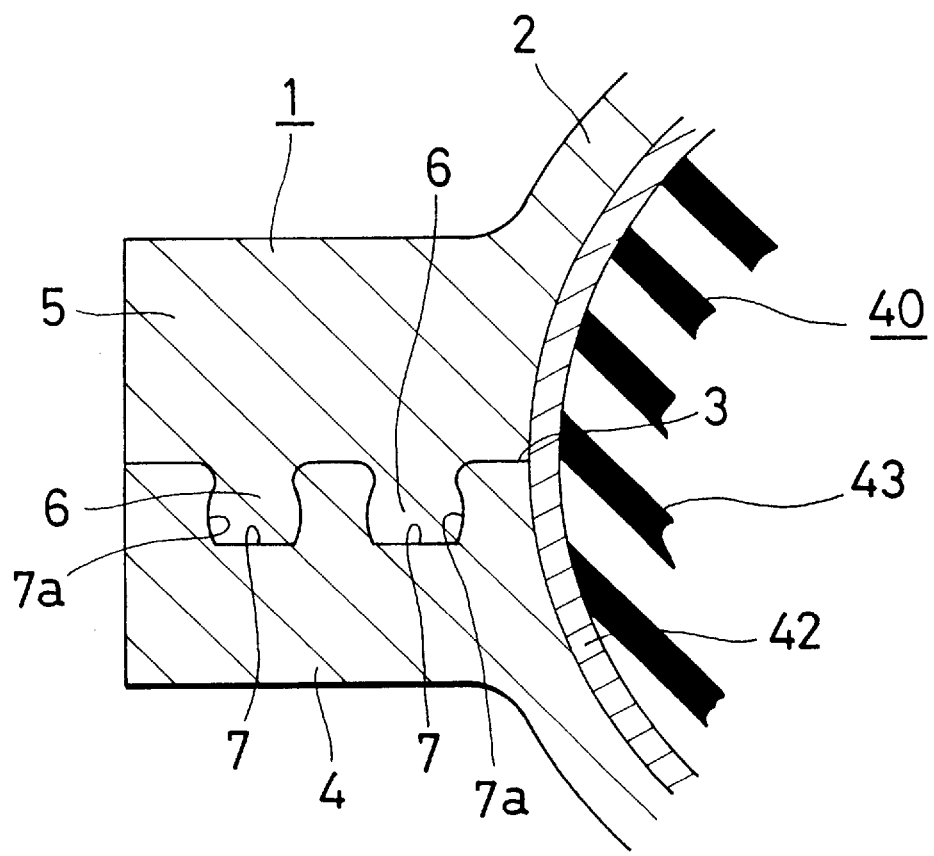
FIG. 4 is an enlarged lateral cross-sectional view that shows how the joints are connected.

When the joints (4) (5) are pressed by means of a press so that they come close to each other in order to close the opening (3), the flattened piece (6) of one joint (5) fits into the dovetail groove (7) of the other joint (4). This causes the tip of the flattened piece (6) to abut the bottom of the dovetail groove (7) before the opening (3) is closed. When the joints (4) (5) are further pressed in this condition so that they are tightly attached, the flattened piece (6) is plastically deformed in a pressure-squeezed manner in conformance with the shape of the dovetail groove (7) as shown in FIG. 4. This causes the flattened piece (6) to be inserted into the dovetail groove (7) that includes the enlarged section (7a). The opposite sides of the joints (4) (5) come closer to each other in a direction of tight attachment, and the opening (3) shrinks and ultimately becomes closed. At the same time, the inner circumference surface of the holder (2) of the mounting component (1) tightly attaches to the outer circumference surface of the bushing (40), and thus the bushing (40) becomes securely clamped.

When the pressure on the joints (4) (5) is released in this state, the flattened piece (6), which has been deformed and inserted into the dovetail groove (7), has bitten deeply enough into the enlarged section (7a) of the dovetail groove to completely prevent the joints from separating. In this manner the clamped and secured condition inside the holder (2) of the bushing (40) is maintained.

The component for mounting a bushing fabricated in this manner as an anti-vibration mount can be attached to the target component by means of joints (4) (5) of the mounting component (1). It should be noted that, in order to attach the component for mounting a bushing to a target component, one of the joints (4) (5) can be extended in an outer radial direction. Alternatively, an attachment component can be provided on the outer circumference surface of the mounting component, separate from the joint.

It should also be noted that the flattened piece (6) does not need to be inserted into the entire interior of the dovetail groove (7). It suffices that the flattened piece (6) is plastically deformed and bites into the enlarged section (7a) of the dovetail groove (7) so that the flattened piece (6) is prevented from dislodging from the dovetail groove.

(Embodiment Mode 2)

Figure 5A:
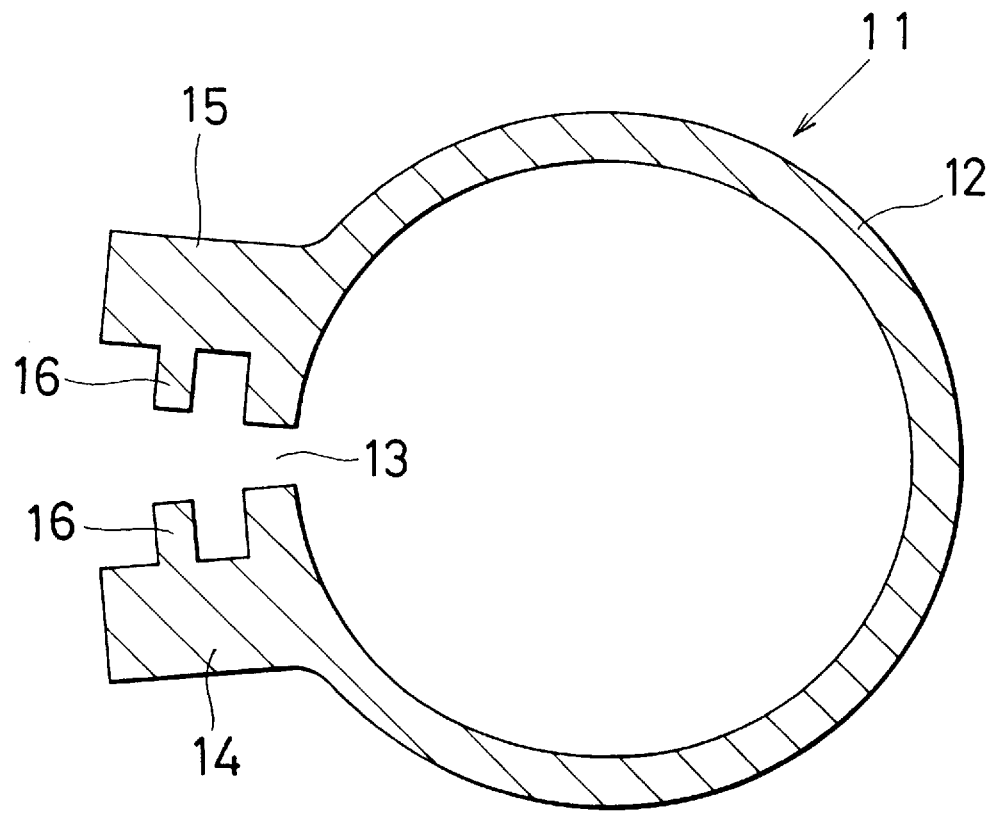
FIG. 5A is a lateral cross-sectional view of the mounting component for bushing.
Figure 5B:
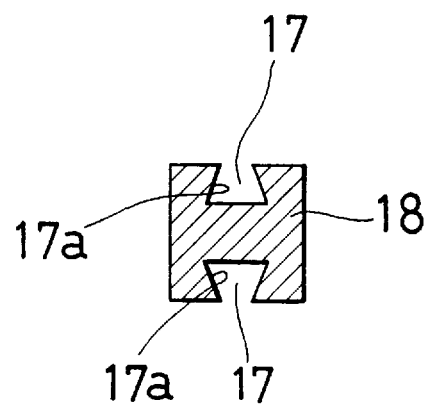
FIG. 5B is a lateral cross-sectional view of a coupling device.
Figure 6:
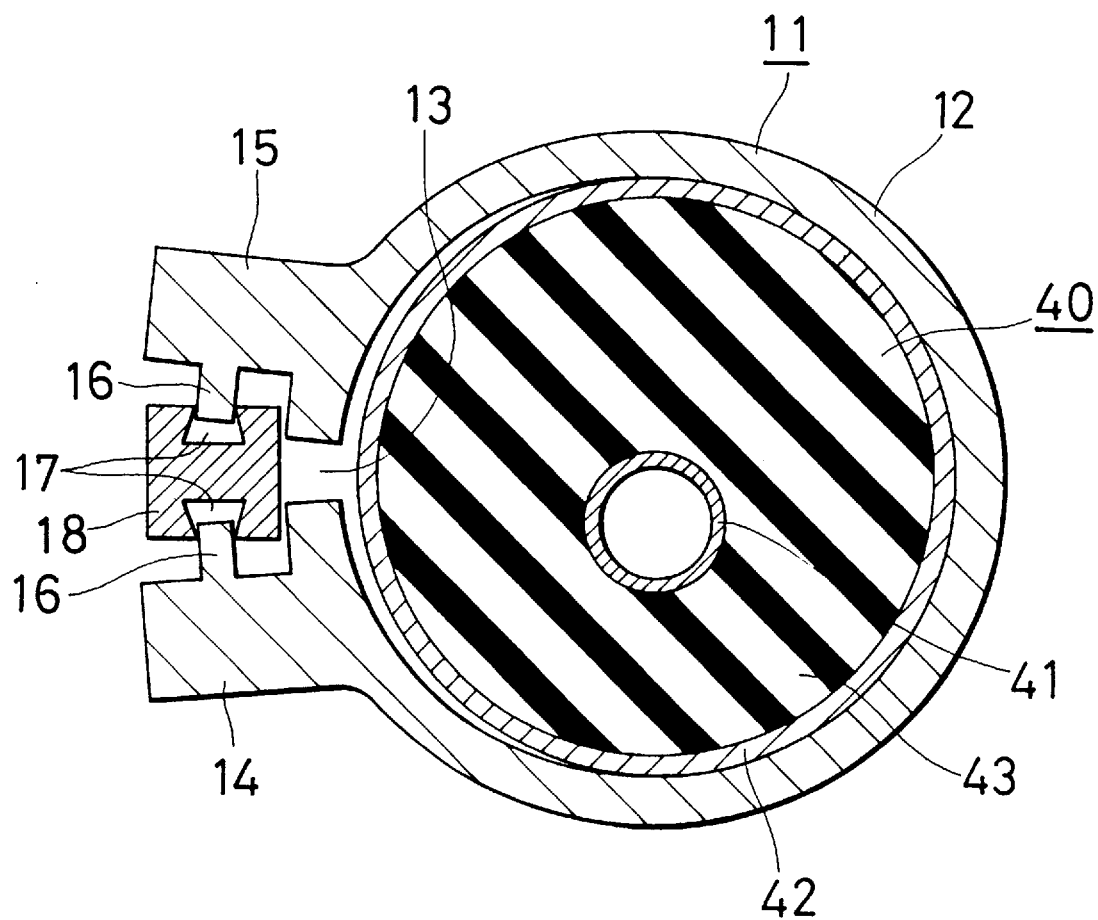
FIG. 6 is a lateral cross-sectional view that shows the opening being closed after a bushing is inserted into the mounting component for a bushing of FIG. 5.
Figure 7:
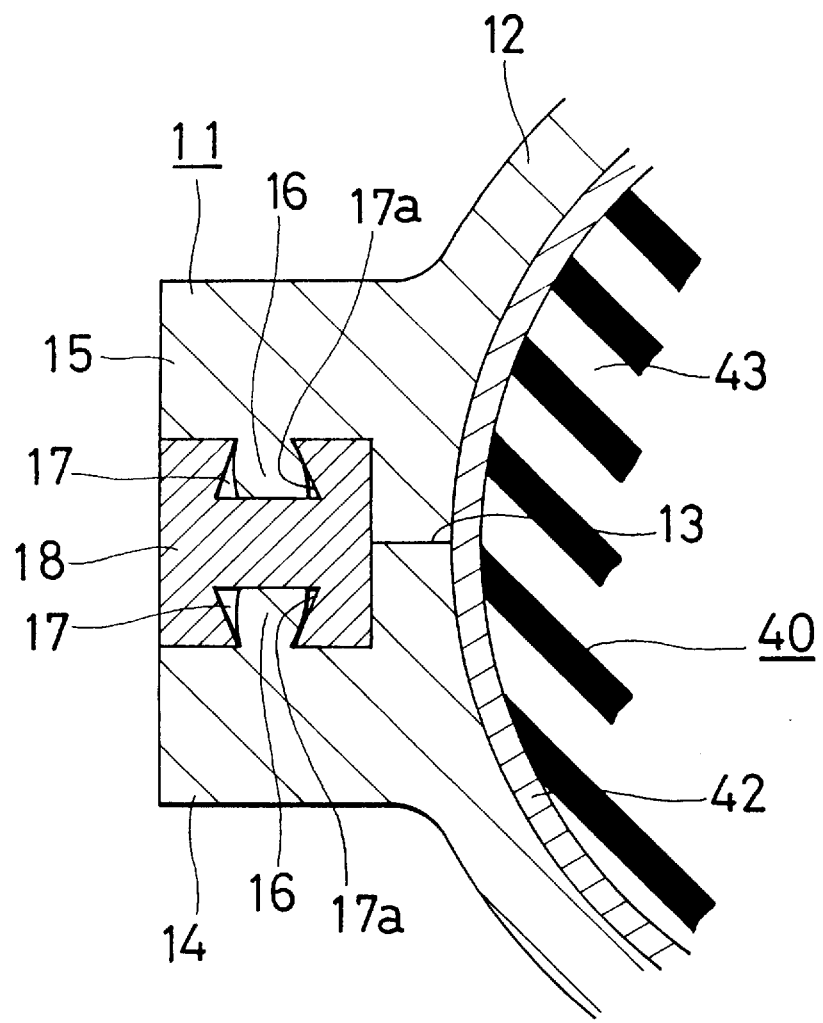
FIG. 7 is an enlarged lateral cross-sectional view that shows how the joints are connected.

FIGS. 5–7 show the second embodiment mode of the present invention that is applied to an automobile engine-mounting bracket. This embodiment mode entails connecting the joints for a mounting component by means of a coupling device made of aluminum.

Figure 3:
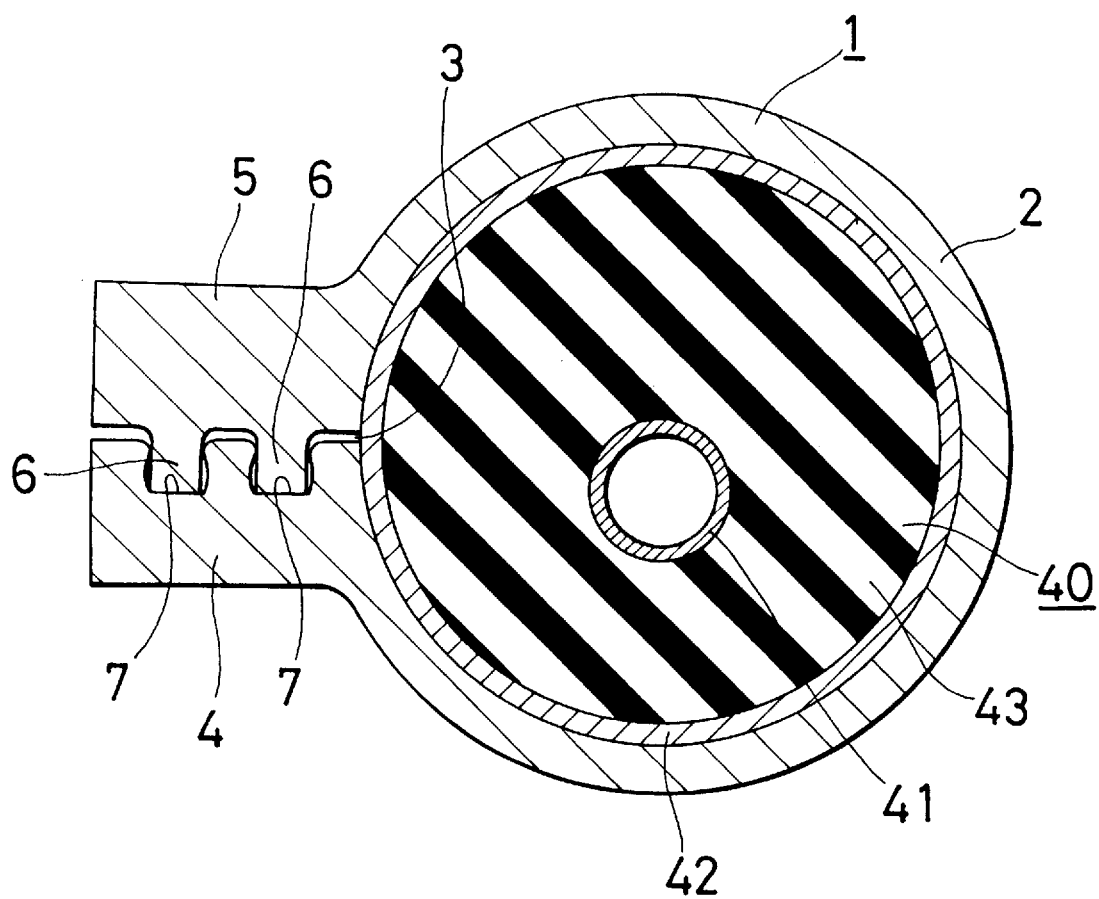
FIG. 3 is a lateral cross-sectional view that shows the opening being closed after the bushing is mounted.

In the mounting component (11) shown in these figures, (12) denotes a holder and (13) denotes an opening, both of which have the same constitution as in FIGS. 1–3. On both open edges of the opening (13), a pair of joints (14) (15) with a square cross section, protruding on the outer circumference surface over the entire axial direction area, are provided at opposite, slightly separated, positions in the circumference direction. On one of the opposite sides of the joints (14) (15), a flattened piece (16) with a square cross section that extends in an axial direction is provided. On the other hand, (18) is a coupling device. The coupling device (18) is formed with a rectangular cross section that has the same length and width as the opposite faces of the joints (14) (15). On the two sides of the coupling device (18) that face the joints, biting grooves (17) that extend in an axial direction are formed at opposite positions. The flattened piece (16) and the biting grooves (17) serve to couple the joints (14) (15) through the coupling device (18), and thus hold the opening (13) in a closed condition. This is done by packing the aforementioned flattened piece (16) into the biting grooves (17) by plastically deforming the former. For this purpose, the biting groove (17) contains an enlarged section (17a) (at the mid-point in the depth direction) such that the width of the groove increases continuously in a dovetail groove manner from the top toward the bottom. Likewise, the flattened piece (16) is set so that the height of its protrusion is greater than the depth of the biting groove (17). When the opening (13) is closed, the deformed and inserted flattened piece (16) bites into the enlarged section (17a) deeply enough to strongly prevent the joints (14) (15) from separating. Moreover, the height of the coupling device (18) is set so that, when the opening (3) is closed, the opposite sides of the coupling device (18) and the joints (14) (15) are tightly attached to each other.

The following explains how the component for mounting a bushing shown in FIGS. 5–7 is used: At the opening (13) the holder (12) is expanded within the range of the holder s elastic limit so that the inner circumference length of the holder is substantially increased. In this condition, a cylindrical anti-vibration bushing (40) is inserted into the holder (12), as shown in FIGS. 1–4.

Then, as shown in FIG. 6, the coupling device (18) is inserted between the joints (14) (15) in a specified orientation. After that, the joints (14) (15) are pressed by means of a press so that they come close to each other in order to close the opening (13). This causes the flattened pieces (16) of the joints to fit into the biting grooves (17) of the coupling device (18), so that the ends of the flattened pieces (16) will abut the bottoms of the biting grooves (17) before the opening (13) is closed. When the joints (14) (15) are further pressed in this condition so that they are tightly attached, the flattened pieces (16) are plastically deformed in a pressure-squeezed, tilted manner and bite into the enlarged sections (17a) of the biting grooves (17), as shown in FIG. 7. This causes the mutually opposite sides of the joints and the coupling device (18) to approach each other in a tightly attaching direction. This shrinks the opening (13) and eventually closes it. At the same time, the inner circumference surface of the holder (12) of the mounting component (11) tightly attaches to the outer circumference surface of the bushing (40), and thus the bushing (40) becomes securely clamped.

When the pressure on the joints (14) (15) is released in this state, the flattened pieces (16), which have been deformed and inserted into the biting grooves (17), have bitten into the enlarged sections (17a) of the biting grooves deeply enough to securely prevent the joints from separating. In this manner the clamped and secured condition inside the holder (12) of the bushing (40) is maintained.

The component for mounting a bushing fabricated in this manner as an anti-vibration mount can be attached to the target component by means of joints (14) (15) for the mounting component (11). It should be noted that, in order to attach the component for mounting a bushing mounting component to a target component, one of the joints (14) (15) can be extended in an outer radial direction. Alternatively, an attachment component can be provided on the outer circumference surface of the mounting component as separate from a joint.

The above embodiment mode provides flattened pieces in the joints (14) (15) and biting grooves (17) in the coupling device (18). However, alternatively biting grooves may be provided in the joints (14) (15) and flattened pieces in the coupling device (18). Also, a flattened piece may be provided in one joint and a biting groove in the other joint, and a corresponding biting groove and flattened piece may be provided in the coupling device. Furthermore, the flattened piece (16) may be plastically deformed so that it completely fills the biting groove (17).

(Embodiment Mode 3)

Figure 8:
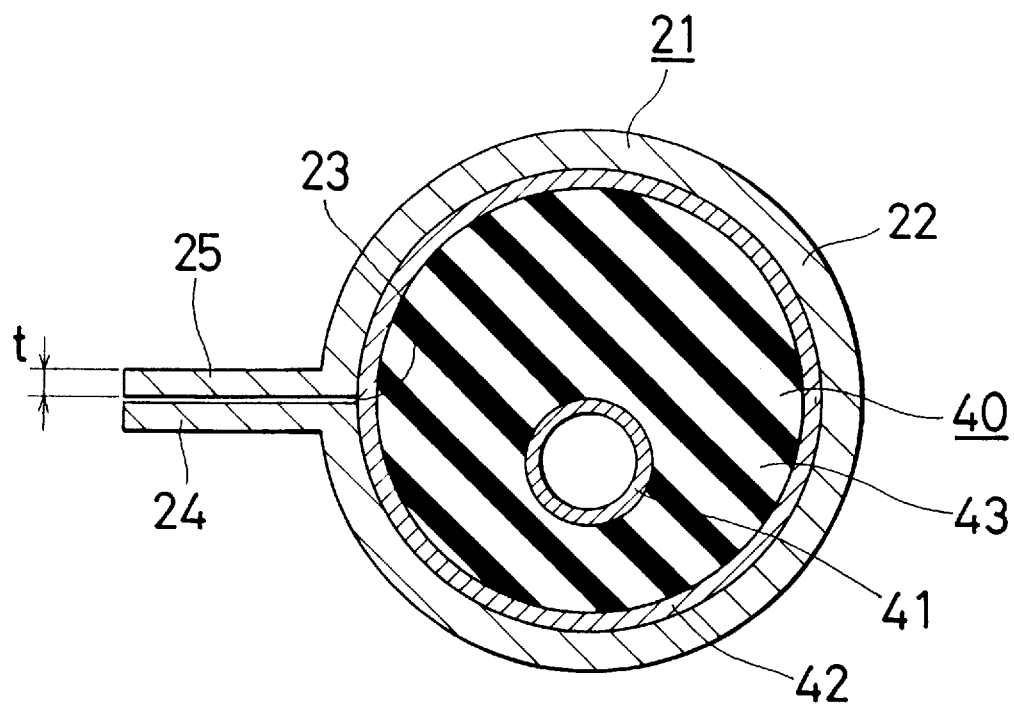
FIG. 8 shows a third embodiment mode of the present invention; it is a lateral cross-sectional view that shows the opening closed after a bushing is inserted into the mounting component.
Figure 9:
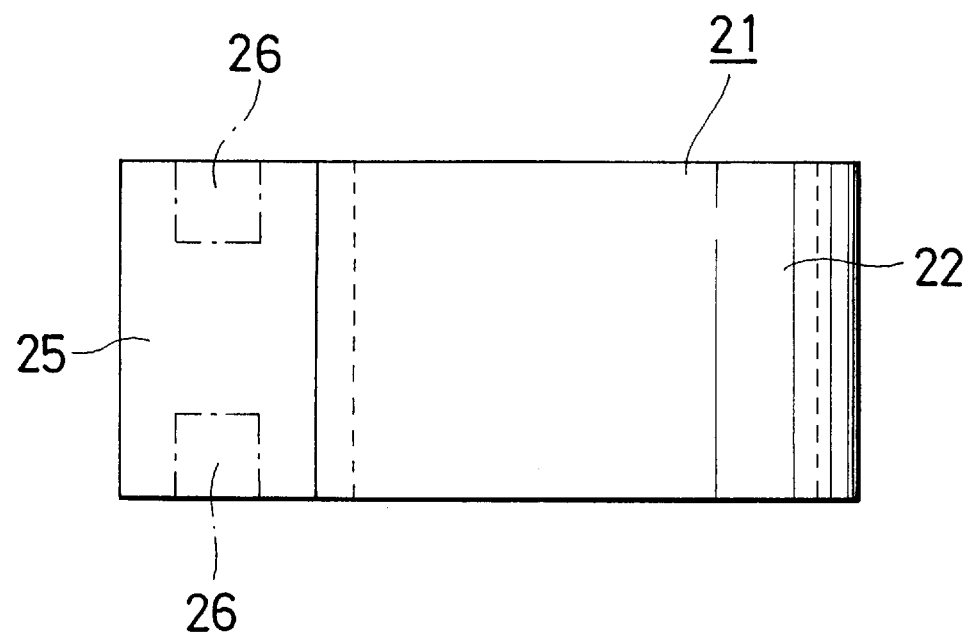
FIG. 9 is a planar view of FIG. 8.
Figure 10A:
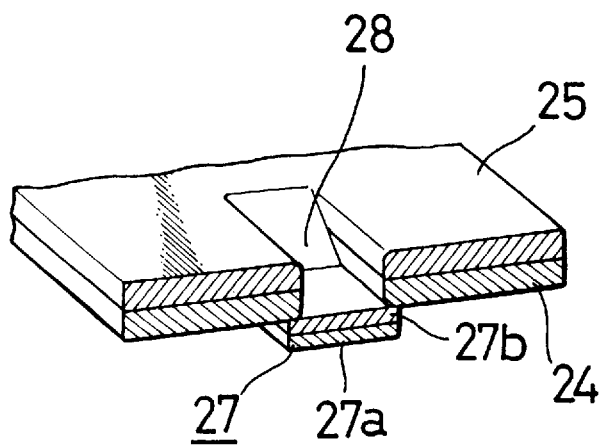
FIG. 10A is perspective view that shows the plastic deformation of a joint by a shearing force.
Figure 10C:
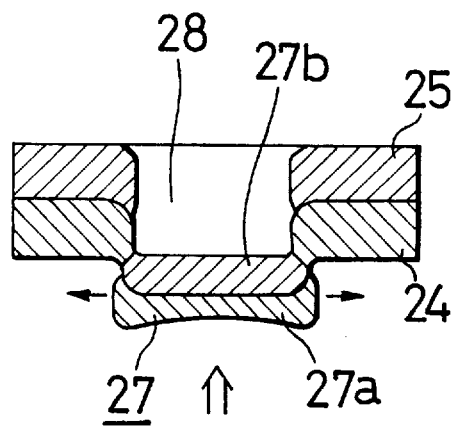
FIG. 10C is a lateral cross-sectional view that shows the area around the deformed part after the deformed part has been pressed.
Figure 10B:
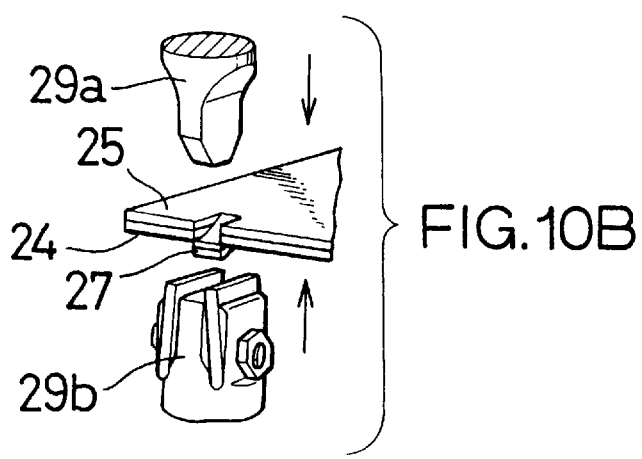
FIG. 10B is a perspective view that shows the condition of the deformed part after it is deformed and before it is pressed.
Figure 11:
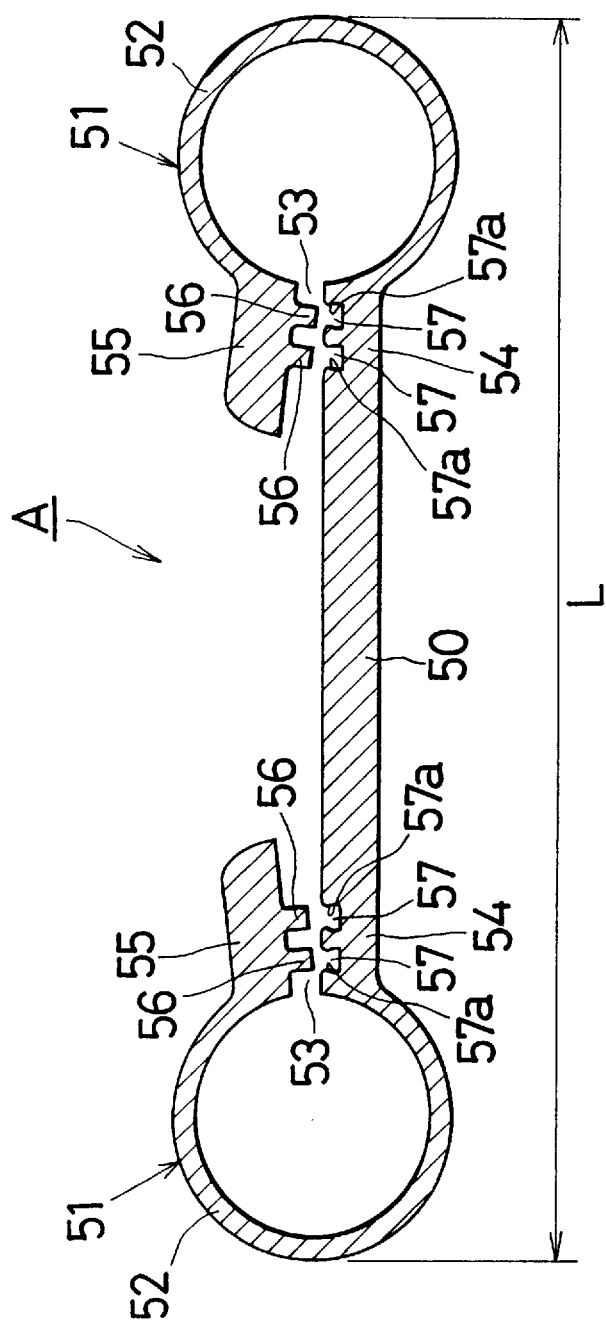
FIG. 11 is a lateral cross-sectional view of the mounting component of the fourth embodiment mode of the present invention.
Figure 12:
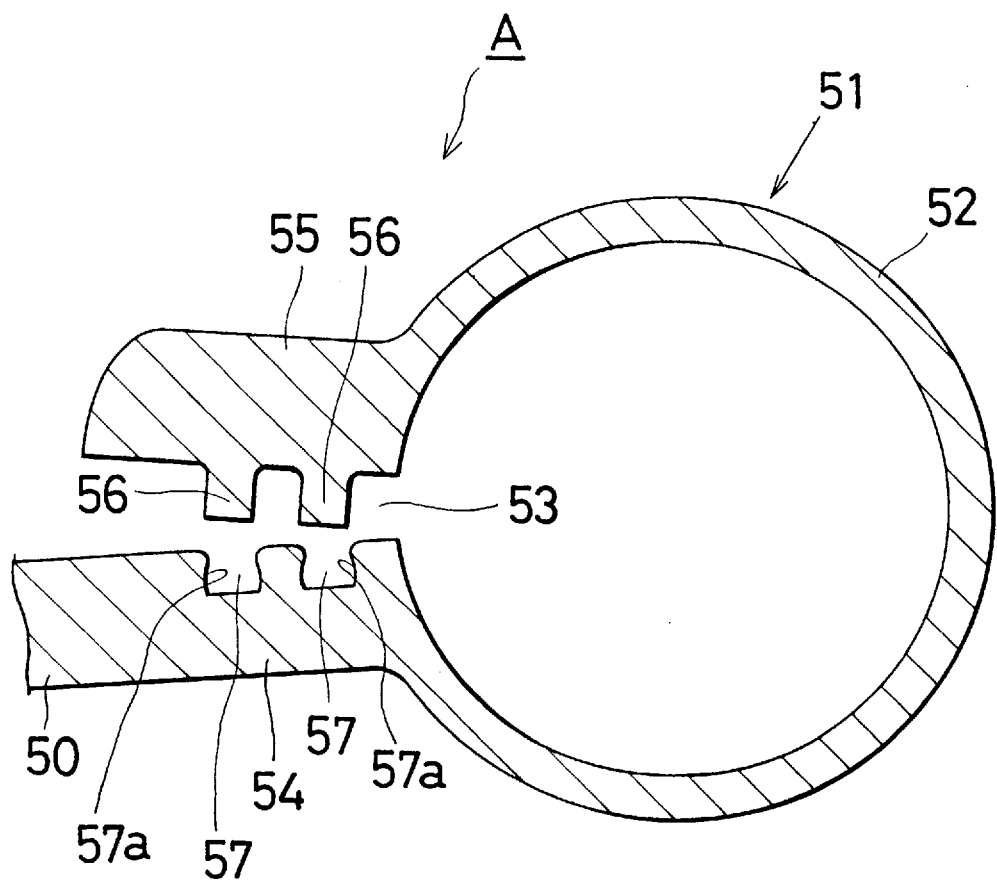
FIG. 12 is a partial, enlarged view of FIG. 11.

FIGS. 8–10 show the third embodiment mode of the present invention that is applied to an automobile engine-mounting bracket. This embodiment mode adopts shearing bonding as a bonding structure by means of the plastic deformation of joints.

In the cylindrical mounting component (21) shown in there figures, (22) denotes a holder and (23) an opening. These units have the same constitution as in FIGS. 1–3. On both open edges of the opening (23), a pair of relatively thin joints (24) (25) protruding on the outer circumference surface over the entire axial direction area, are provided at opposite positions in the circumference direction.

In the mounting component (21), at the opening (23) the holder (22) is expanded within the range of the holder s elastic limit so that the inner circumferencial length of the holder is substantially increased. In this condition, a cylindrical anti-vibration bushing (40), of the same constitution as shown in FIGS. 1–3, is inserted into the holder (22). The joints (24) (25) are pressed in a tightening direction to close the opening (23), and the inner circumference surface of the holder (22) is tightly attached to the outer circumference surface of the bushing (40) in order to fasten the bushing by clamping.

In the next step, a plastic deformation force in the direction of depth and the like, shearing force, is applied to the site to be deformed (26) (indicated by the dotted lines in FIG. 9) on the joints (24) (25) that are superimposed. This is shown in FIG. 10A. The deforming is performed so that, as shown in FIG. 10C, a part of the thickness of the joint (25) in the backward direction of the shearing force (the upper parts in FIGS. 8 and 10) will slightly remain in the sheared hole (28) that is created by the shearing operation. Subsequently, the deformed section (27) is pressed in the direction of thickness by means of a shearing punch (29a) and an anvil (29b) that is provided in the lower mold. This increases the radial direction width of the joint (27b) in the backward shearing direction (the upper part) of the deformed section (27). This causes the deformed section to bite into the sidewall of the shearing hole (28). On the other hand, the burr for the joint (27a) in the forward shearing direction (the lower part) is increased in order to make the width in the radial direction larger than the width of the shearing hole (28) so that the joint will not be dislodged in a direction opposite the shearing direction. This increases the bonding force of the joints (24) (25) so that the bushing (40) is securely clamped and locked in the holder (22).

In such a shearing bonding structure, there are no particular restrictions on the size or position of the shearing deformed section (27). These factors, however, should be set so that enough bonding power is generated to prevent the occurrence of any gap between the joints. Furthermore, thickness t of the joints (24) (25) should be determined appropriately by taking the rigidity and the shearing load on the joints into consideration.

(Embodiment Mode 4)

FIGS. 11–15 show the fourth embodiment mode of the present invention that is applied to automobile suspension arm components. In these figures, (A) denotes a component for bushings used as an automobile suspension arm component; it is made by cutting an aluminum extruded shaped material having the cross-section shape shown in FIG. 11 into a specified length in an axial (extruding) direction. On the mounting piece (A), mounting components (51) comprised of cylindrical anti-vibration bushings are attached on the two ends in the direction of length of the square-column component (50). The mounting components (51) are comprised of cylindrical holders (52) into which the bushings (40) are fitted. On the mounting components, one location in the circumferential direction of each holder (52) is sectioned so that an opening (53) is formed that extends in an axial direction. Therefore, the holders (52) open in a spanning manner at the openings (53).

On both open edges of an opening (53), a pair of joints (54) (55) with a square cross section, protruding on the outer circumference surface over the entire axial direction area, are provided at opposite positions in the circumference direction. One of the joints (54) is formed in an integral manner with the component (50) at the tip of the component (50) on the protruding side. On one of the opposite sides of the joints (54) (55), a flattened piece (56) with a square cross section that extends in an axial direction in two inner and outer columns is provided. The other side is provided with a biting groove (57) that extends in an axial direction in two inner and outer columns at the positions opposite the aforementioned flattened pieces (56). These flattened pieces (56) and the biting grooves (57) serve to couple the joints (54) (55), and thus holds the opening (53) in a closed condition This is done by packing the aforementioned flattened piece (56) into the biting groove (57) by plastically deforming the former. For this purpose, the biting groove (57) contains an enlarged section (57a) (at the mid-point in the depth direction) with a large opening area, such that the groove is wider at the mid-point than at the upper or lower end. Likewise, the flattened piece (56) is set so that the height of its protrusion is greater than the depth of the biting groove (57) and the lateral cross-sectional area of the flattened piece is set approximately equal to that of the biting groove (57). When the opening (53) is closed, the deformed and inserted flattened piece (56) bites into the enlarged section (57a) deeply enough to strongly prevent the joints (54) (55) from separating.

Figure 13:
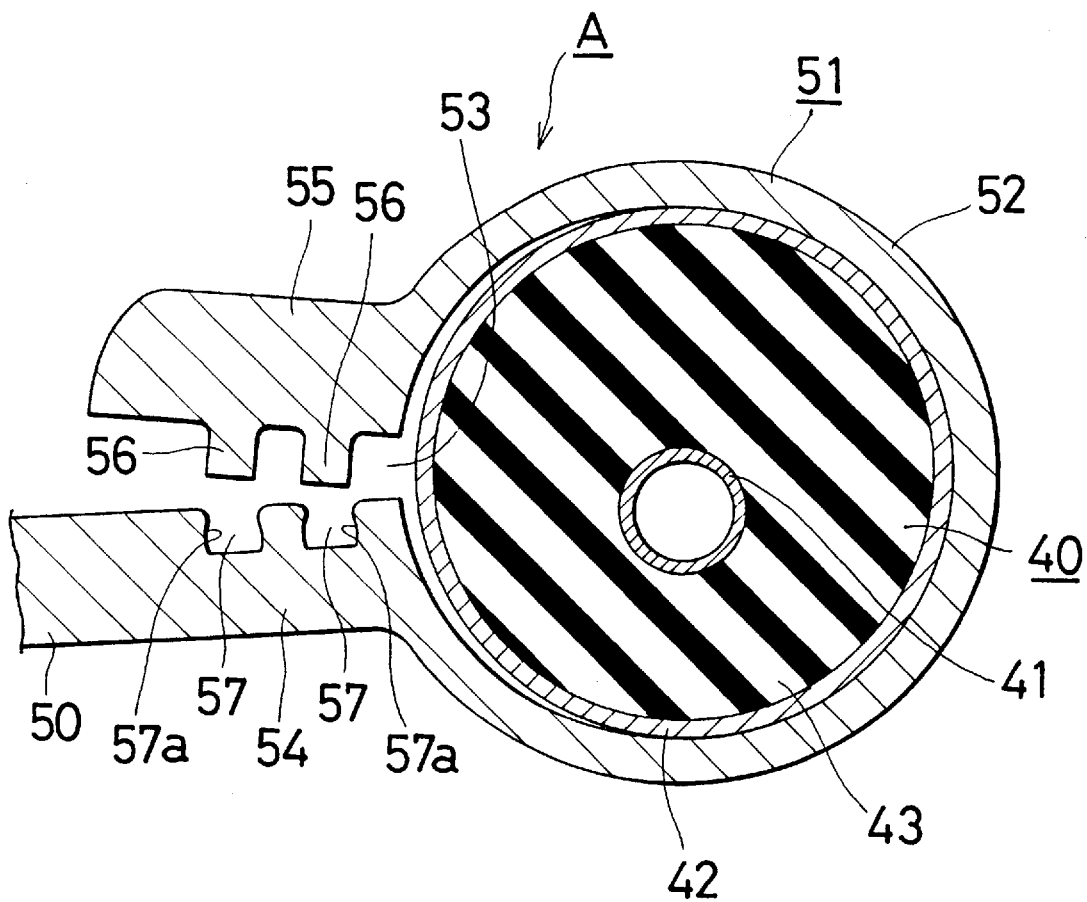
FIG. 13 is a lateral cross-sectional view of the mounting component of FIG. 11 into which a bushing is inserted.

The following explains how the bushing is held by the mounting piece (A) of the present embodiment mode. At the opening (53) the holder (52) is expanded within the range of the holder s elastic limit so that the inner circumference length of the holder is substantially increased. In this condition, a cylindrical anti-vibration bushing (40) is inserted into the holder (52), as shown in FIG. 13. In this embodiment mode a solid-type bushing (40) is used. In this bushing (40) the center-positioned axial support component (41) and the cylindrical rigid sleeve (42) that is provided around the axial support component (41) are connected by a rubber elastic body (43), which is inserted between them. The outer diameter of the rigid sleeve (42) is set so that it is slightly larger than the inner diameter of the holder when the opening (53) of the holder (52) is closed. And, because the holder (52) is expanded at the opening (53), the bushing (40) can easily be inserted into the holder (52).

Figure 14:
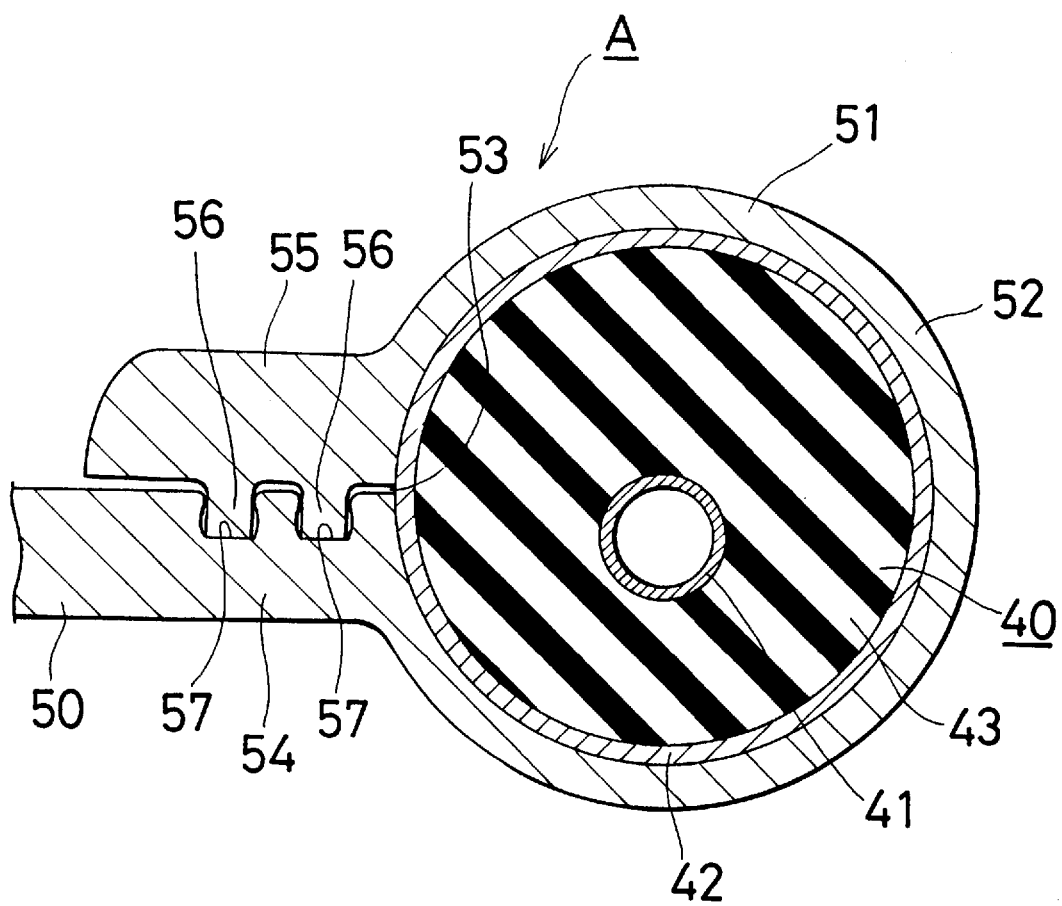
FIG. 14 is a lateral cross-sectional view that shows the opening being closed after the bushing is inserted.
Figure 15:
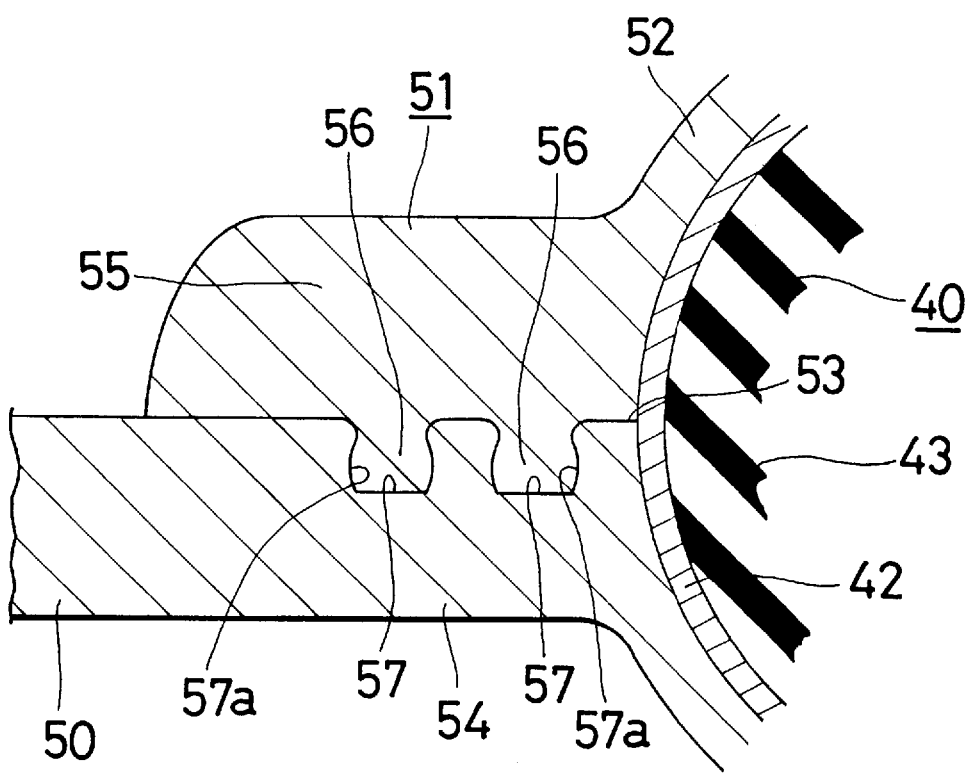
FIG. 15 is an enlarged lateral cross-sectional view that shows how the joints are connected.

When the joints (54) (55) are pressed by means of a press so that they come close to each other in order to close the opening (53), the flattened piece (56) of one joint (54) fits into the biting groove (57) of the other joint (55). This causes the tip of the flattened piece (56) to abut the bottom of the biting groove (57) before the opening (58) is closed, as shown in FIG. 14. When the joints (54) (55) are further pressed in this condition so that they are tightly attached, the flattened piece (56) is plastically deformed in a pressure-squeezed manner in conformance to the shape of the biting groove (57), as shown in FIG. 15. This causes the flattened piece to be inserted into the biting groove (57) that includes the enlarged section (57a). The opposite sides of the joints (54) (55) come closer to each other in a direction of tight attachment, and the opening (53) shrinks and eventually becomes closed. At the same time, the inner circumference surface of the holder (52) of the mounting component (51) tightly attaches to the outer circumference surface of the bushing (40), and thus the bushing (40) becomes securely clamped.

When the pressure on the joints (54) (55) is released in this state, the flattened piece (56), which has been deformed and inserted into the biting groove (57), has bitten into the enlarged section (57a) of the biting groove deeply enough to securely prevent the joints from separating. In this manner the clamped and secured condition inside the holder (52) of the bushing (40) is maintained.

(Embodiment Mode 5)

Figure 16A:
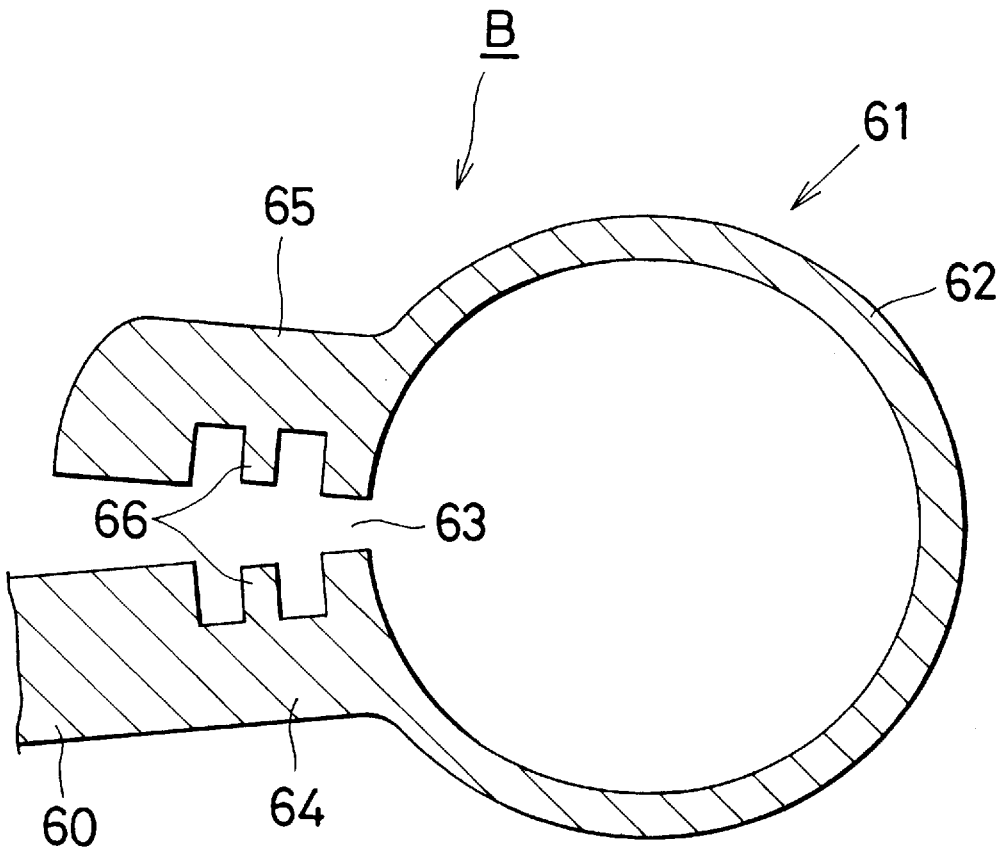
FIG. 16A is a lateral cross-sectional view of the mounting component of a fifth embodiment mode of the present invention.
Figure 16B:
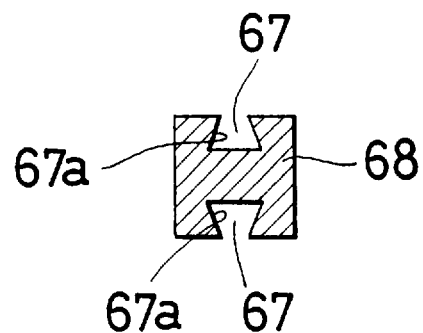
FIG. 16B is a lateral cross-sectional view of a coupling device.
Figure 17:
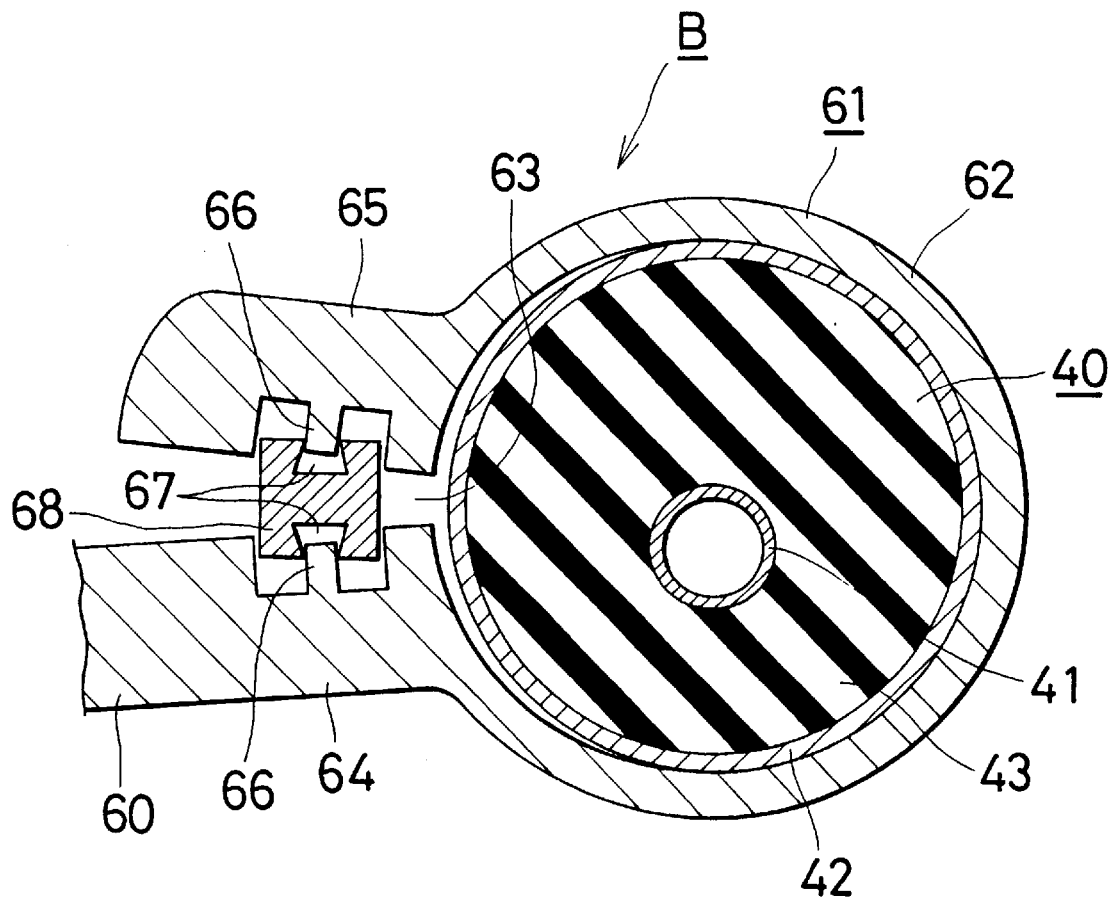
FIG. 17 is a lateral cross-sectional view that shows the opening being closed after a bushing is inserted into the mounting component of FIG. 16.
Figure 18:
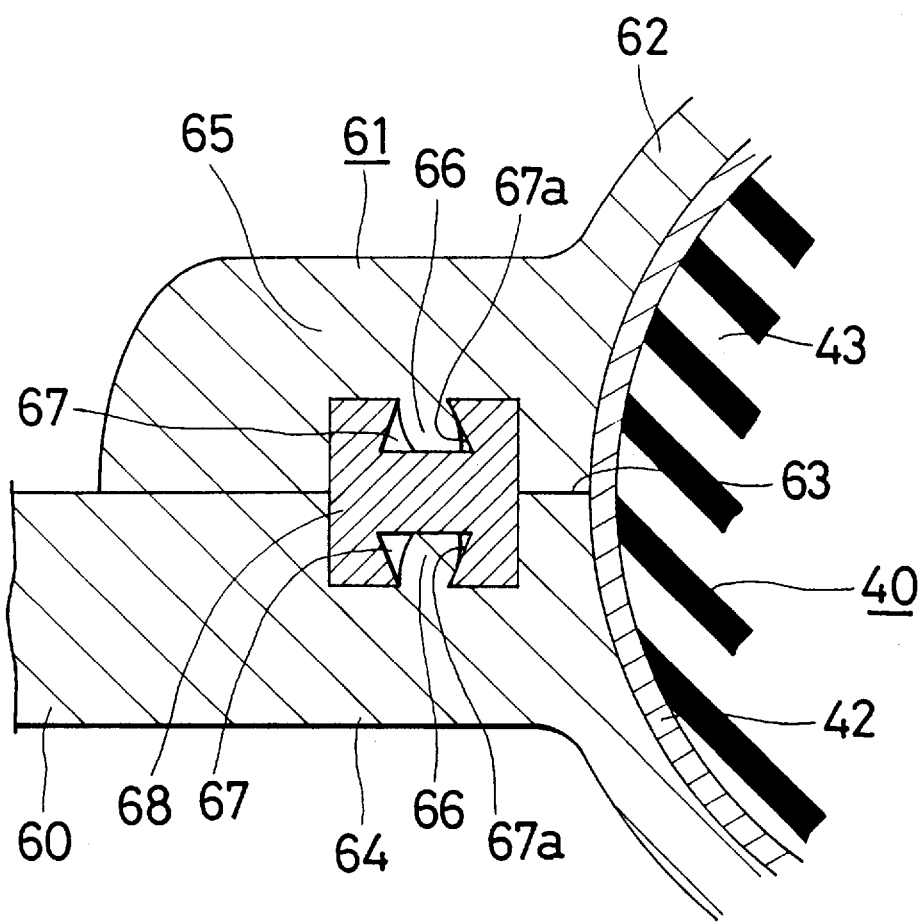
FIG. 18 is an enlarged lateral cross-sectional view that shows how the joints are connected.

FIGS. 16–18 show the fifth embodiment mode of the present invention that is applied to automobile suspension arm components. This embodiment mode entails connecting the joints (64) (65) for a mounting component (61) by means of a coupling device made of aluminum.

On the for mounting piece (B) shown in these figures, mounting components (61) are formed on the two ends in the direction of length of a rod-shaped component (60) whose overall configuration parallels that shown in FIGS. 11 through 15. The mounting piece is made by cutting an aluminum extruded shaped material having the cross-section shape shown in FIG. 16 into a specified length in an axial direction.

In the aforementioned mounting component (61), (62) denotes a holder and (63) denotes an opening, both of which have the same constitution as (A) in FIGS. 11–15. On both open edges of the opening (63), a pair of joints (64) (65) with a square cross section, protruding on the outer circumference surface over the entire axial direction area, are provided at opposite, slightly separated, positions in the circumference direction. One of the joints (64) is formed in an integral manner with the component (60) at the tip of the component (60) on the protruding side. On each of the opposite sides of the joints (64) (65), a flattened piece (66) with a square cross section that extends in an axial direction is provided.

On the other hand, (68) is a coupling device. The coupling device (68) is formed with a rectangular cross section that has the same length and width as the opposite faces of the joints (64) (65). On the two sides of the coupling device (68) that face the joints, biting grooves (67) that extend in an axial direction are formed at the opposite positions. The flattened pieces (66) and the biting grooves (67) serve to couple the joints (64) (65) through the coupling device (68), and thus hold the opening (63) in a closed condition. This is done by packing the aforementioned flattened pieces (66) into the biting grooves (67) by plastically deforming the former. For this purpose, the biting groove (67) contains an enlarged section (67a) such that the width of the groove increases continuously in a dovetail groove manner from the top toward the bottom (with an increasing opening area). Likewise, the flattened piece (66) is set so that the height of its protrusion is greater than the depth of the biting groove (67). When the opening (63) is closed, the deformed and inserted flattened piece (66) bites into the enlarged section (67a) deeply enough to strongly prevent the joints (64) (65) from separating. Moreover, the height of the coupling device (68) is set so that, when the opening (3) is closed, the opposite sides of the coupling device (68) and the joints (64) (65) are tightly attached to each other.

The following explains how the bushing is held using the mounting piece (B) of the present embodiment mode. At the opening (63) the holder (62) is expanded within the range of the holder s elastic limit so that the inner circumference length of the holder is substantially increased. In this condition, a cylindrical anti-vibration bushing (40), having the constitution shown in FIGS. 11–15, is inserted into the holder (62).

Then, as shown in FIG. 17, the coupling device (68) is inserted between the joints (64) (65) in a specified orientation. After that, the joints (64) (65) are pressed by means of a press so that they come close to each other in order to close the opening (68). This causes the flattened pieces (66) of the joints to fit into the biting grooves (67) of coupling device (68), so that the ends of the flattened pieces (66) will abut the bottoms of the biting grooves (67) before the opening (68) is closed. When the joints (64) (65) are further pressed in this condition so that they are tightly attached, the flattened pieces (66) are plastically deformed in a pressure-squeezed, tilted manner and bite into the enlarged sections (67a) of the biting grooves (67), as shown in FIG. 18. This causes the mutually opposite sides of the joints and the coupling device (68) to approach each other in a tightly attaching direction. This shrinks the opening (63) and eventually closes it. At the same time, the inner circumference surface of the holder (62) of the mounting component (61) tightly attaches to the outer circumference surface of the bushing (40), and thus the bushing (40) becomes securely clamped.

When the pressure on the joints (64) (65) is released in this state, the flattened pieces (66), which have been deformed and inserted into the biting grooves (67), have bitten into the enlarged sections (67a) of the biting grooves deeply enough to securely prevent the joints from separating. In this manner the clamped and secured condition inside the holder (62) of the bushing (40) is maintained.

The above embodiment mode provides flattened pieces (66) in the joints (64) (65) and biting grooves (67) in the coupling device (68). However, alternatively biting grooves may be provided in the joints (64) (65) and flattened pieces in the coupling device (68). Also, a flattened piece may be provided in one joint and a biting groove in the other joint, and a corresponding biting groove and flattened piece may be provided in the coupling device. Furthermore, the flattened piece (66) may be plastically deformed so that it completely fills the biting groove (67).

Although the fourth and fifth embodiment modes describe situations where biting grooves (57) (67) are provided over the entire axial direction of the mounting component for bushings (51) (61) as biting recesses into which flattened pieces (56) and (66) bite, it is not necessary that the biting grooves be provided over the entire axial direction of the mounting component for bushing. Alternatively, biting recesses may be formed as one or more through or non-through biting holes (biting holes).

(Embodiment Mode 6)

Figure 19:
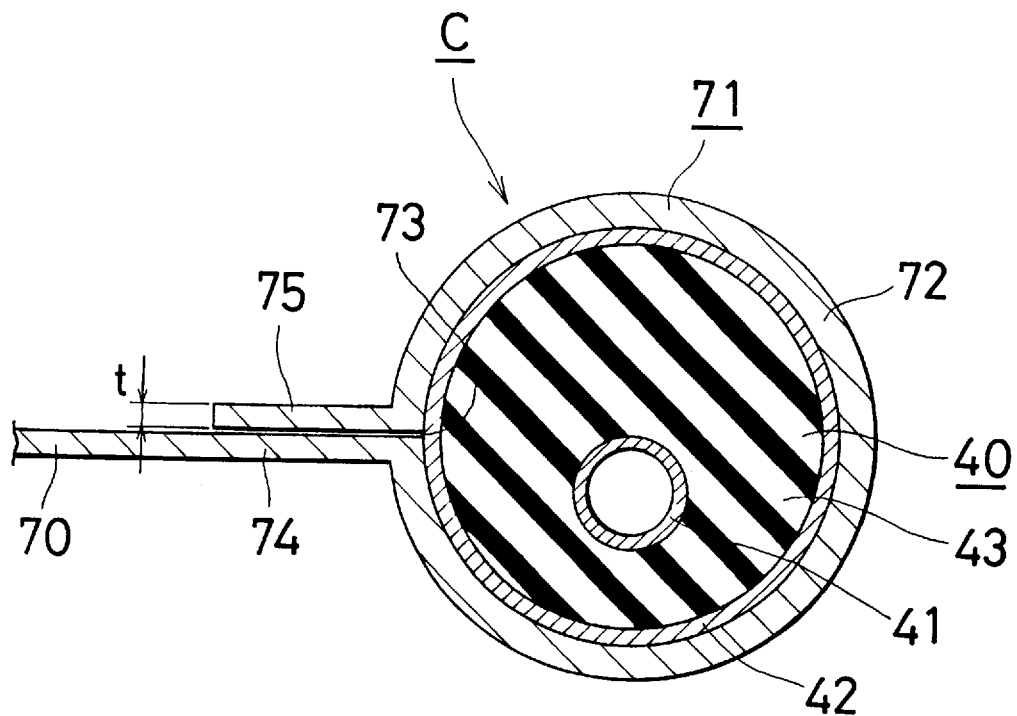
FIG. 19 shows a sixth embodiment mode of the present invention; it is a lateral cross-sectional view that shows the opening being closed after a bushing is inserted into the mounting component.
Figure 20:
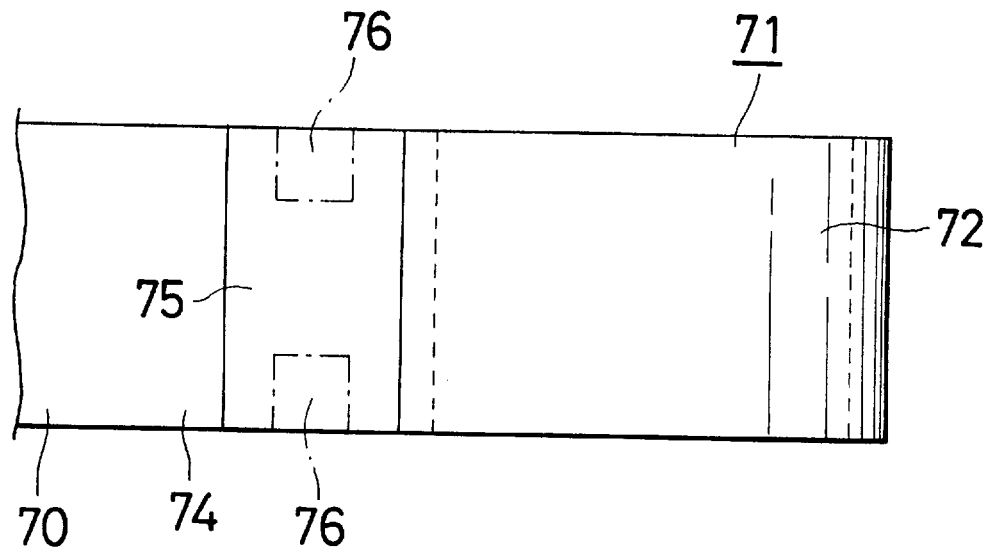
FIG. 20 is a planar view of FIG. 19.
Figure 21A:
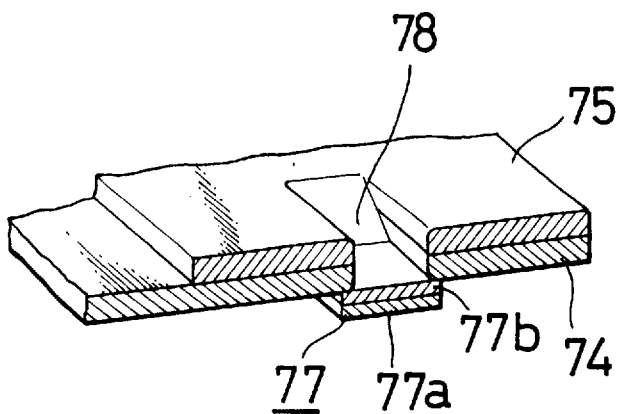
FIG. 21A is a perspective view that shows the plastic deformation of a joint by a shearing force.
Figure 21C:
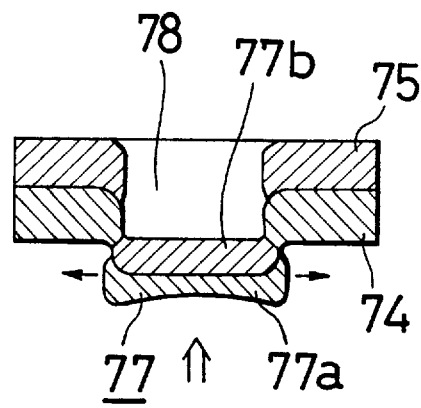
FIG. 21C is a lateral cross-sectional view that shows the area around the deformed part after the deformed part has been pressed.
Figure 21B:
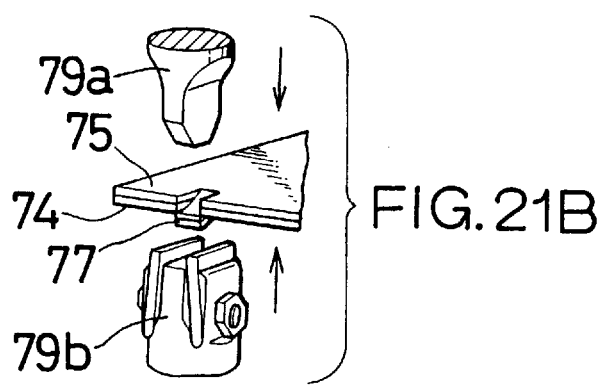
FIG. 21B is a perspective view that shows the condition of the deformed part after it is deformed and before it is pressed.

FIGS. 19–21 show the sixth embodiment mode of the present invention that is applied to automobile suspension arm components. This embodiment mode adopts shearing bonding as a bonding structure by means of the plastic deformation of the joints (74) (75) of the mounting component (72).

The mounting piece (C) shown in these figures has an overall confirmation similar to the mounting piece (A) described in the fourth Embodiment Mode. On this component for mounting a bushing mounting component for bushings (72) are formed on the two ends of a rod-shaped component (70) in the direction of thickness. The mounting piece is made by cutting an aluminum extruded shaped material having the cross-section shape shown in FIG. 19 into specified length in an axial (extruding) direction.

In the aforementioned mounting component for bushing, (72) denotes a holder and (73) an opening. These units have the same constitution as those described in the fourth Embodiment Mode and shown in FIGS. 11–15. On both open edges of the opening (73), a pair of relatively thin joints (74) (75) protruding on the outer circumference surface over the entire axial direction area, are provided at opposite positions in the circumference direction. One of the joints (74) is formed in an integral manner with the component (70) at the tip of the component (70) on the protruding side.

In this mounting component for bushing (71), at the opening (73) the holder (72) is expanded within the range of the holder's elastic limit so that the inner circumference length of the holder is substantially increased. In this condition, a cylindrical bushing (40), of the same constitution as shown in FIGS. 12–15, is inserted into the holder (72). The joints (74) (75) are then pressed in a tightening direction to close the opening (73), and the inner circumference surface of the holder (72) is tightly attached to the outer circumference surface of the bushing (40) in order to fasten the bushing by clamping.

In the next step, the plastic deformation force in the direction of depth, i.e., the shearing force, is applied to the site to be deformed (76) (indicated by the dotted line in FIG. 20) on the joints (74) (75) that are superimposed. This is shown in FIG. 21A. The deforming is performed so that, as shown in FIG. 21C, a part of the thickness of the joint (75) in the backward direction of the shearing force (the upper parts in FIGS. 19 and 21) will slightly remain in the sheared hole (78) that is created by the shearing operation. Subsequently, the deformed section (77) is pressed in the direction of thickness by means of a shearing punch (79a) and an anvil (79b) that is provided in the lower mold. This increases the radial direction width of the joint (77b) in the backward shearing direction (the upper part) of the deformed section (77), as shown in FIG. 21C. This causes the deformed section to bite into the sidewall of the shearing hole (78). On the other hand, the burr for the joint (77a) in the forward shearing direction (the lower part) is increased in order to make the width in the radial direction larger than the width of the shearing hole (78) so that the joint will not be dislodged in a direction opposite the shearing direction. This increases the bonding force of the joints (74) (75) so that the bushing (40) is securely clamped and locked in the holder (72).

In such a shearing bonding structure, there are no particular restrictions on the size or position of the shearing deformed section (77). These factors, however, should be set so that enough bonding power is generated to prevent the occurrence of any gap between the joints. Furthermore, thickness t of the joints (74) (75) should be determined appropriately by taking the rigidity and the shearing load on the joints into consideration.

(Embodiment Mode 7)

Figure 22:
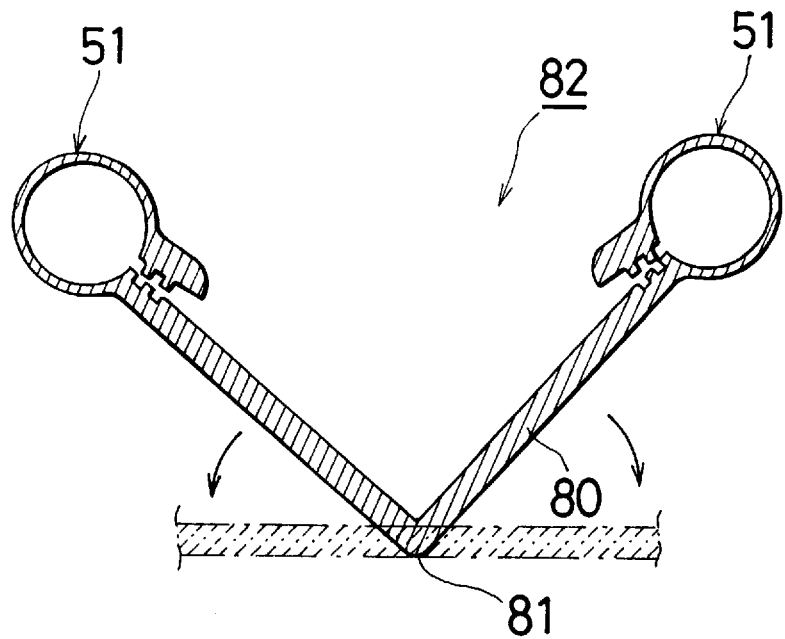
FIG. 22 shows a seventh embodiment mode of the present invention; it is a lateral cross-sectional view that shows an extruded shaped material that possesses one corner on the piece itself; it also shows how the piece is expanded.

In the present invention, when manufacturing an extruded shaped material for a long mounting component for bushings is difficult due to limitation that exists in an extruder or the dimensions of an extrusion die, the long mounting component for a bushing may be manufactured by a method which uses the following forming [lit; developing] process. In other words, first, as illustrated in FIGS. 22 and 28, extrude a formed components (82) (83) having one or a plurality of arc corner portions (81) in the cross sectional view [lit; shape] on the composite body. Then, slice these extruded components (82) (83) into a predetermined thickness in the axial direction and forming [lit; develop] the aforementioned corner portions linearly to obtain the targeted shape. The forming [lit; developing] process is not specifically limited and any publicly known technique such as the roll forming, press forming, and the drawing forming techniques may be applied at one's convenience. In addition, the forming [lit; developing] process not only forms [lit; develops] [materials] two dimensionally but also forms [lit; develops] [the material] three dimensionally by twisting. In this way, formed extruded shaped material provides a much longer mounting component for bushing than the die diameter.

Figure 23:
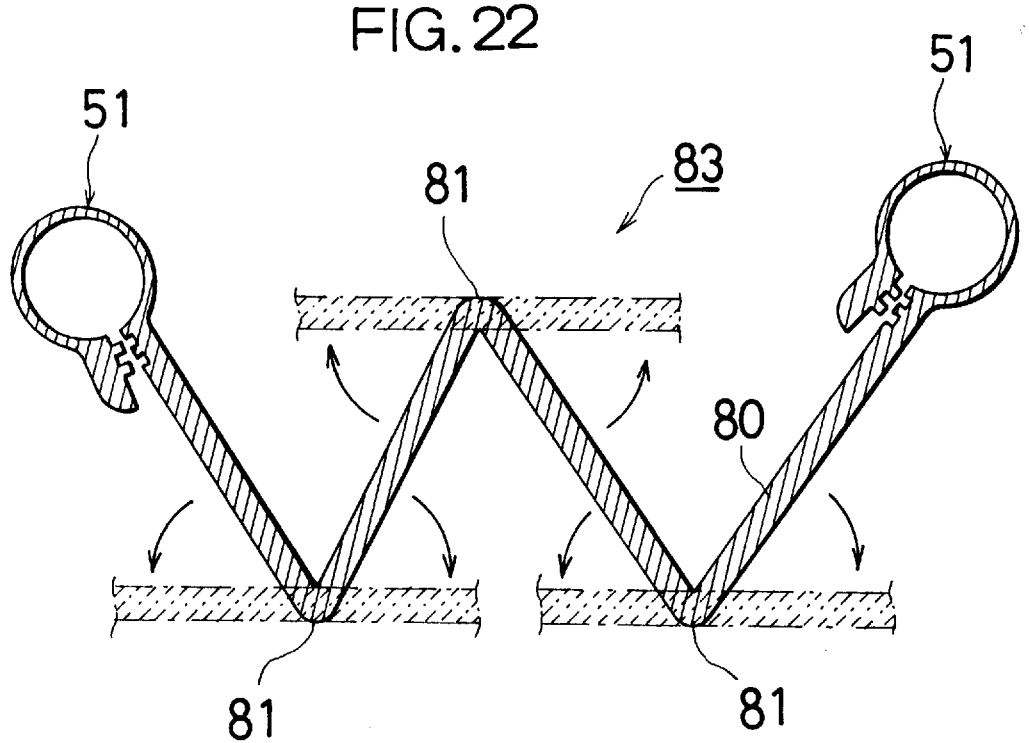
FIG. 23 shows a variant of the seventh embodiment mode of the present invention; it is a lateral cross-sectional view that shows an extruded shaped material that possesses several corners on the piece itself; it also shows how the piece is expanded.
Figure 27:
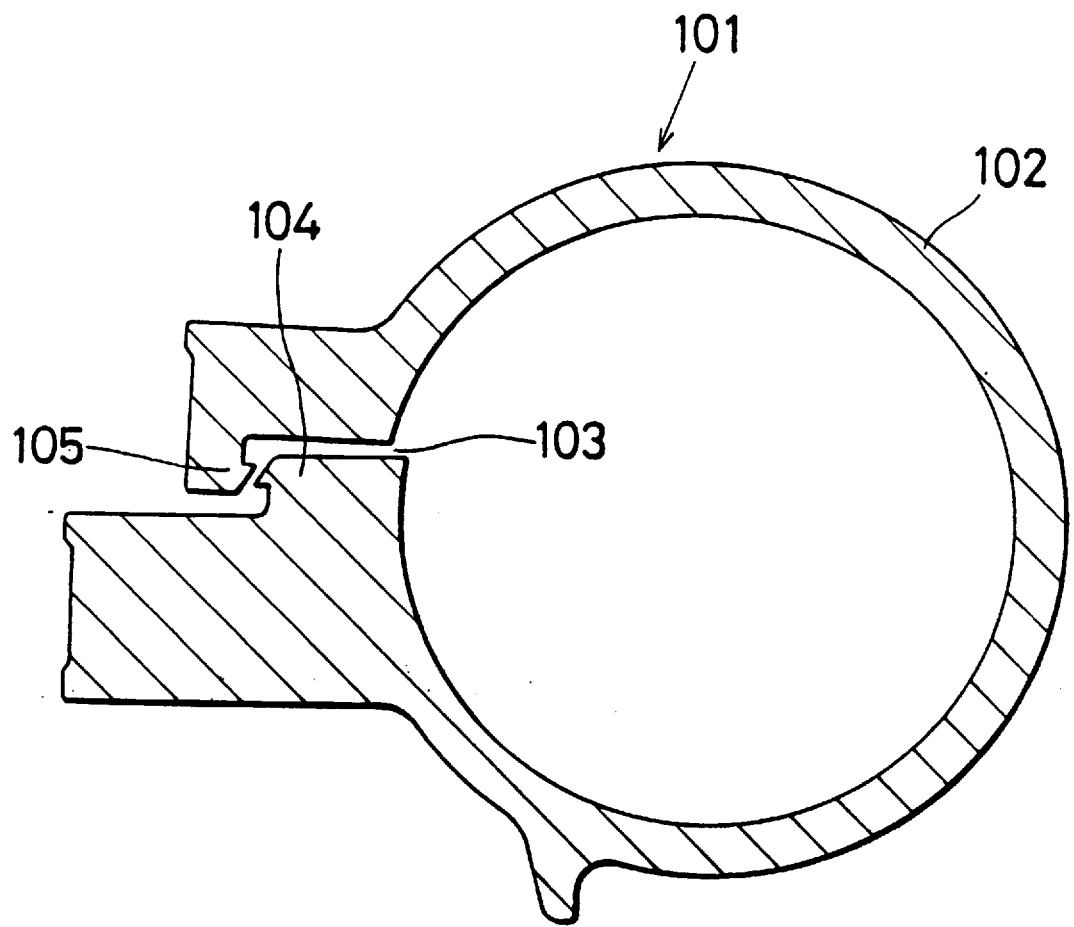
FIG. 27 is a lateral cross-sectional view of the coupling structure of a mounting component for bushing of the prior art.

Also, the number of corners (81) on the aforementioned extrusion-formed components (82) (83) is not specifically limited. The direction in which the cornered portion (81) is bent is not limited: as illustrated in FIG. 23, the cornered portions (81) which are next to each other may have alternate curving directions or all corners (81) may have the same curving directions consisting of multi-angles.

Furthermore, regardless of whether or not the mounting component [for a bushing] of the present invention has the type of joint structure for the mounting portion or employs the forming [developing] process, the mounting component for a bushing has the following common features:

First, JIS 6000 type aluminum is preferable for the mounting component for bushing material in terms of the tenacity required for automobile components and the extrudability and formability [lit; developability]. The JIS6N01 and 6061 aluminum are specifically preferable. A die cast aluminum product and the like may be used in place of the extruded aluminum material.

Each of the dimensions for the mounting component for a bushing is set considering appropriate dimensions required for the automobile components and the fact that it is an extruded shaped material. For example, when applying this [material] to a component for the use in a suspension arm, the total arm length (L) shown in FIG. 11 of about 100 to about 1700 mm is preferable, and 500 mm or more is specifically preferable for the aforementioned forming process product. In addition, the range of about 30 to about 100 mm is preferable for a diameter of a mounting component for a bushing, about 5 to 50 mm is preferable for the thickness (the thickness by which the material is cut during slicing).

When forming mounting portion (51) (61) for bushing on both ends of the aforementioned component bodies (50) (60) (70) (80), the mounting portion for bushing can be symmetrical on both ends (FIGS. 11 and 22) or non-symmetrical (FIG. 23). Also, the shape of the component bodies (50) (60) (70) (80) is not limited to a specific shape: they can be in any shape such as a bar or, for example, A-shape.

In addition, when forming a mounting component for bushing from the extruded shaped material, the thickness can be varied according to the tenacity required for each parts. In general, in the mounting component for bushing for the use in the automotive suspension arm, stress concentrates on the portion at which the joints between aforementioned bush-mounting portion and the body are joined while stress less concentrates on the component body itself. For example, in the mounting component for bushing (A) of the fourth embodiment, made by providing the same thickness for the joint (54) on the component-body joint side of the mounting portion for bushing (51) and for the component body (50), and at the same time, by increasing the thickness for the other joint (55), the component-body joint after mounting the bushing (40) will be more than twice thick than the component body (50), the stress concentration can be excellently handled thereon. On the other hand, when [the joint] is not required to have a relatively high tenacity, one may want to reduce weight as far as the required tenacity is maintained, by forming a hollow potion in the shape of "harmonica" (phonetic translation) or "truss" (phonetic translation) as illustrated in the component body (50a) (50b) in FIGS. 24A and 24B. In this way, by varying the thickness according to the level of tenacity required for each part, weight can be reduced while increasing tenacity for the bush-mounting component. Also, even when providing a forming [lit; developing] processing on the component body portion, by loyally forming corner portions, one may reduce weight by manufacturing a component body having a hollow portion. Moreover, one may want to form a bolt hole on the component body portion for mounting assistance.

It is also possible that one form a expanding section where the opening area increases toward the depth direction for the railcut recess in the first, second, fourth, and fifth embodiments such that the flattened piece is plastically deformed such that it cannot be dislodged; the shapes of these are specifically illustrated in the FIGS. 25A through C. FIG. 25 is shaped the same as the railcut recesses (7) (57) of the first and fourth embodiments illustrated in FIG. 25A: sides are curved and the expanding section (7a) having the largest opening area compared with the top and bottom ends, is formed in the middle, in the depth direction. Also, FIG. 25B shows the same shape as the railcut recesses (17) (67) of the second and the fifth embodiments illustrated in FIG. 25; the groove width widens continuously from the top to the bottom in the depth direction (the opening area increases) like a cone [lit; an ant nest], forming an expanding section (17a) over the entire area in the depth direction. Furthermore, FIG. 25C illustrates the railcut recess (37) having a curved side surface; the groove width widens continuously from the top to the bottom in the depth direction, forming an expanding section (37a) over the entire area in the depth direction.

The flattened piece is not always need to have an expanding section in the depth direction, but rather, as illustrated in FIG. 26A, the railcut recess (47) can be straight in the depth direction providing the same groove width [for any area]; or as illustrated in B of the same figure, its angle (θ) can be slanted by less than 30 degree with respect to the depth direction, increasing the bonding force between the railcut recess and the flattened piece.

To ensure the status in which [the flattened piece] cannot be dislodged after bonding, one may want to finish the cross sectional shape of the railcut recess and flattened piece in the aforementioned manner. Also, one may want to simply increase the depth of the railcut recess and the length of the flattened piece, or to increase the number of [railcut recesses and flattened pieces] to obtain an effective biting [lit; effectively obtain the status in which it cannot be dislodged].

Furthermore, in the aforementioned joint, forming more than two railcut recesses in the length direction of the joint and with increased space between them may provide the effective biting with respect to the stress in the twisting direction.

In the third and sixth embodiments, by increasing the number or area of deformed sections (27) (77) or increasing the space between the deformed sections, the same biting status as the aforementioned first, second, fourth and fifth embodiments can be obtained.

Also, in the mounting portions for bushing (1) (11) (21) (51) (61) (71), the tightening degree ($\delta$) for the holders (2) (12) (22) (52) (62) (72) is represented by the equation $\delta=d-D$, calculated based on the outer diameter (d) for the anti-vibration bushing (40), and the inner diameter (D) for the holders (2) (12) (22) (52) (62) (72) during the complete closed status calculated based on the length of their inner circumferences. About 0 to about 5 mm is preferable for the aforementioned tightening level ($\delta$) At less than 0 mm, that is, when d<D, there is a space between the bushing (40) and the holders (2) (12) (22) (52) (62) (72) and the bushing (40) cannot be held within the holders (2) (12) (22) (52) (62) (72). At 5 mm or longer, no matter how hard the joints (4) (5) (14) (15) (24)(25) (54) (55) (64) (65) (74) (75) are plastically deformed, the openings (3) (13) (23) (53) (63) (73) cannot be completely closed to fill the flattened pieces (6) (16) (56)(66) into the railcut recesses (7) (17) (57) (67) and the bonding force is weakened. The specific lowest limit to the tightening level ($\delta$) is 0.05 mm, the highest limit is 1.0 mm.

Also, in the first, second, fourth, and fifth embodiment modes, the flattened pieces (6) (16) (56) (66) are not necessarily filled in the railcut recess (7) (17) (57) (67) entirely; however, they can be in a state in that the flattened pieces (6) (16) (56) (66) are plastically deformed and bite the expanding sections (7a) (17a) (57a) (67a) in the flattened pieces (7) (17) (57) (67) so that the flattened pieces (7) (17) (57) (67) are prevented from being withdrawn. However, if there is a space between the joints after mounting and fixing, dirt and water may come in from the space to cause corrosion, and it may deteriorate the strength of mounting component for bushing. For this reason, it is preferable to make the shape of the joints so that it eliminates the space after coupling as much as possible, and to further reduce the space by plastic deformation. Since dirt and water gradually come into even from a minute space, it is preferable that the interfaces of the joints (4) (5) (14) (15) (54) (55) (64) (65) are soldered by, for example, a laser welding or a friction welding, or they are adhered by adhesive such as sealant, lock tight, and the like. Also in the third and sixth embodiment modes, by soldering or adhering the space between the deformed sections (27) (67) and the joints (24) (25) (74) (75), the invasion of dirt and water can be more surely prevented.

Moreover, a solid type is used for bushing (40), in which the journal (41) located in the center and the cylindrical rigid sleeve (42) provided in the circumference of the journal are connected by the rubber elastic body (48) which is inserted therebetween However, another type may be used for bushing (40), in which the rigid outer sleeve (42) is not used, a liquid is enclosed inside the rubber elastic body (43) from the inlet provided on the outer circumference surface, and an anti-vibration function is obtained with the enclosed liquid. In this case, if the joining operation by press is carried out in the liquid for the joints (4) (5) (14) (15) (24) (25) (54) (55) (64) (65) (74) (75), enclosing the liquid into the rubber elastic body and joining the joints are carried out simultaneously, simplifying the process.

According to the above mentioned description, the present invention is a clamping-type mounting component for a cylindrical bushing comprising the holder into which the cylindrical bushing is fitted, such that the opening is formed that extends in an axial direction at one location in the circumferential direction in the aforementioned holder; at the opening the holder can be opened in a spanning manner; and the bushing is fitted and fixed in the holder when the opening is held in a closed state and the inner circumference surface of the holder is tightly attached to the outer circumference surface of the bushing. Therefore, compared to a press-fitted type in which the bushing is press-fitted into the holder of the mounting component, it does not require the precise measurement of the distance between the bushing and the mounting component, and a special process is not needed for finishing the inner circumference surface of the holder of the mounting component in a required dimension.

In addition, the joints protruding from the outer circumference surface are provided either at the edges of the opening or in their vicinity; such that the opening is held in a closed state when these joints are coupled by means of a coupling structure that uses a plastic deformation. Therefore, even when there are errors in shape and dimension of the joints, the joints may be plastically deformed to cancel the errors. For this reason, the precise measurement of dimension is unnecessary as has been previously required for joint structure in which the protrusion engagement section and the hood section are engaged with each other, thus facilitating the process for the joints.

Further, one of the joints is provided with a flattened piece that protrudes toward the other joint, wherein on a railcut recess having an expanding section, the opening area of which increases in the depth direction, is formed at the position on the other joint that corresponds to the flattened piece, and wherein the joints are coupled when the flattened piece is inserted into the railcut recess and when the flattened piece is plastically deformed in such a way that it bites into the expanding section so that it cannot be withdrawn. Since the joints are directly individually connected, the assembly operation can be effectively done and a strong tenacity can be obtained for the joint.

Furthermore, either a flattened piece or a railcut recess is created in each joint; wherein a coupling device is placed between the joints, such that on the coupling device either a railcut recess is created in correspondence to the flattened piece on the joint or a flattened piece is created in correspondence to the railcut recess on the joint; such that the joints are connected by means of the coupling device either when the flattened piece of the one joint is inserted into the railcut recess of the coupling device and is plastically deformed in such a way that the flattened piece bites into the expanding section so that it cannot be withdrawn or when the flattened piece of the coupling device is inserted into the railcut recess of the joint and is plastically deformed in such a way that the flattened piece bites into the expanding section so that it cannot be withdrawn. In this case, even when there are errors in dimension for the railcut recess or flattened piece provided for each joint, the errors can be canceled by adjusting the position of the railcut recess or the flattened piece provided for the joints, thus obtaining the effect that the precise measurement of the dimension for the mounting component may be less necessary.

Moreover, when the joints are bonded in a superimposed condition such that a part of the joints is deformed in a shearing direction, the joints do not need to be provided with a railcut recess or a flattened piece. Therefore, the cross shape of the joints can be made simple and its thickness thin, simplifying the manufacture of the mounting component and reducing the materials used, and thus providing an advantage in reducing the manufacturing cost.

What is claimed is:

1. A mounting body comprising:

a bushing;

a holder portion that defines a bore that receives the bushing and a slit that communicates with the bore and allows the holder to open and the bore to expand for easy insertion of the bushing;

a pair of joint portions extending from the holder portion on opposite sides of the slit, said joint portions including locking means for securing the joint portions together when the holder portion lies in a closed position, said locking means including a deformable portion that deforms beyond its elastic limit.

2. A mounting body comprising:

a bushing;

a holder portion that defines a bore that receives the bushing and a slit that communicates with the bore and allows the holder to open and the bore to expand for easy insertion of the bushing;

a pair of joint connected to the holder portion and extending outwardly of the bore, said joint being disposed adjacent the slit on opposite sides of the slit, one joint including a recess and the other joint including a protrusion that extends into the recess and deforms beyond its elastic limit to lock the two joints together.

3. The mounting body as recited in claim 2, wherein one of said joints for the holder portion is provided with a flattened piece that protrudes toward the other joint, wherein a railcut recess having an expanding section, the opening area of which increases as its depth increases, is formed at the position on the other joint that corresponds to the flattened piece, and wherein the joints are coupled when the flattened piece is inserted into the railcut recess and when the flattened piece is plastically deformed in such a way that it bites into the expanding section so that it cannot be withdrawn.

4. The mounting body as recited in claim 2, wherein either a flattened piece or a railcut recess is created in the joint for the mounting body, wherein a coupling device is placed between the joints, wherein on the coupling device either a railcut recess is created in correspondence to the flattened piece on the joint or a flattened piece is created in correspondence to the railcut recess on the joint, wherein the railcut recess possesses an expanding section the opening area of which increases in the depth direction, and wherein the joints are connected by means of the coupling device either when the flattened piece of the one joint is inserted into the railcut recess of the coupling device and is plastically deformed in such a way that the flattened piece bites into the expanding section so that it cannot be withdrawn or when the flattened piece of the coupling device is inserted into the railcut recess of the joint and is plastically deformed in such a way that the flattened piece bites into the expanding section so that it cannot be withdrawn.

5. The mounting body as recited in claim 2, wherein the joints for the mounting body are joined in a superimposed condition such that a part of the joints is deformed in a shearing direction.

* * * * *